US012634236B2

(12) United States Patent (10) Patent No.: US 12,634,236 B2
Salkintzis (45) Date of Patent: May 19, 2026

(54) ACCESS TRAFFIC STEERING USING A PLURALITY OF STEERING CONNECTIONS OVER DIFFERENT ACCESS NETWORKS

(71) Applicant: Lenovo (Singapore) PTE. LTD., New Tech Park (SG)

(72) Inventor: Apostolis Salkintzis, Athens (GR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 352 days.

(21) Appl. No.: 17/279,073

(22) PCT Filed: Feb. 28, 2020

(86) PCT No.: PCT/EP2020/055261
§ 371 (c)(1),
(2) Date: Mar. 23, 2021

(87) PCT Pub. No.: WO2021/170248
PCT Pub. Date: Sep. 2, 2021

(65) Prior Publication Data
US 2022/0116327 A1 Apr. 14, 2022

(51) Int. Cl.
*H04L 47/122* (2022.01)
(52) U.S. Cl.
CPC .................................. *H04L 47/122* (2013.01)
(58) Field of Classification Search
None
See application file for complete search history.

(56) References Cited

U.S. PATENT DOCUMENTS

2018/0097657 A1* 4/2018 Dao ..................... H04L 41/0893
2018/0234471 A1* 8/2018 Qian ....................... H04L 69/16
(Continued)

FOREIGN PATENT DOCUMENTS

CN 110830429 A 2/2020
WO 2020036928 A1 2/2020

OTHER PUBLICATIONS

3GPP, "3rd Generation Partnership Project: Technical Specification Group Services and System Aspects; Study on access traffic steering, switch and splitting support in the 5G system architecture (Release 16)", 3GPP TR 23.793 v16.0.0, Dec. 2018, pp. 1-114 (Year: 2018).*
(Continued)

*Primary Examiner* — Mariela Vidal Carpio
(74) *Attorney, Agent, or Firm* — Kunzler Needham Hilton

(57) ABSTRACT
Apparatuses, methods, and systems are disclosed for steering the traffic of the multi-access data connection over a plurality of steering connections. One apparatus includes a includes a transceiver and a processor that sends a first message to establish a multi-access data connection over a first access network and a second access network, where the first message indicates that the apparatus supports a first type of steering functionality that creates a plurality of steering connections over each of access networks. The processor receives a second message including rules indicating how to route a first data packet across the first and second access networks and how to route the first data packet across a plurality of steering connections. The processor establishes a plurality of steering connections over each access network in response to the second message and applies the rules for steering traffic of the multi-access data connection.

20 Claims, 11 Drawing Sheets

(56)                    References Cited

U.S. PATENT DOCUMENTS

| | | | | |
|---|---|---|---|---|
| 2019/0288935 | A1* | 9/2019 | Sen | H04L 45/44 |
| 2020/0120015 | A1* | 4/2020 | Boucadair | H04N 21/64707 |
| 2020/0120018 | A1* | 4/2020 | Taveira | H04L 63/166 |
| 2020/0344164 | A1* | 10/2020 | Zhang | H04L 67/1038 |
| 2021/0092664 | A1* | 3/2021 | Lai | H04W 36/0011 |
| 2021/0135944 | A1* | 5/2021 | S | H04L 41/0893 |
| 2021/0168905 | A1* | 6/2021 | Yu | H04L 69/14 |
| 2021/0219364 | A1* | 7/2021 | Tang | H04W 28/0268 |
| 2021/0306275 | A1* | 9/2021 | Ke | H04L 12/4633 |
| 2022/0225211 | A1* | 7/2022 | Yu | H04W 40/12 |
| 2022/0225349 | A1* | 7/2022 | Chin | H04W 68/12 |
| 2022/0393970 | A1* | 12/2022 | Amend | H04L 47/2433 |
| 2022/0407799 | A1* | 12/2022 | Amend | H04L 12/4633 |
| 2023/0056442 | A1* | 2/2023 | Ly | H04W 24/08 |
| 2023/0074838 | A1* | 3/2023 | De Foy | H04W 76/15 |

OTHER PUBLICATIONS

PCT/EP2020/055261, "Notification of Transmittal of the International Search Report and the Written Opinion of the International Searching authority, or the Declaration", International Searching Authority, Oct. 29, 2020, pp. 1-21.

3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.

3GPP, "3rd Generation Partnership Project: Technical Specification Group Services and System Aspects; Study on access traffic steering, switch and splitting support in the 5G system architecture (Release 16)", 3GPP TR 23.793/16.0.0, Dec. 2018, pp. 1-114.

3GPP, "3rd Generation Partnership Project; Technical Specification Group Core Network and Terminals; Non-Access- Stratum (NAS) protocol for 5G System (5GS); Stage 3; (Release 17)", 3GPP TS 24.501 V17.1.0, Dec. 2020, pp. 1-745.

3GPP, "[Draft] LS on Multipath Solution based on QUIC/MP-QUIC", SA WG2 Meeting #S2-137E, S2-2002197, Feb. 24-28, 2020, pp. 1-2.

* cited by examiner

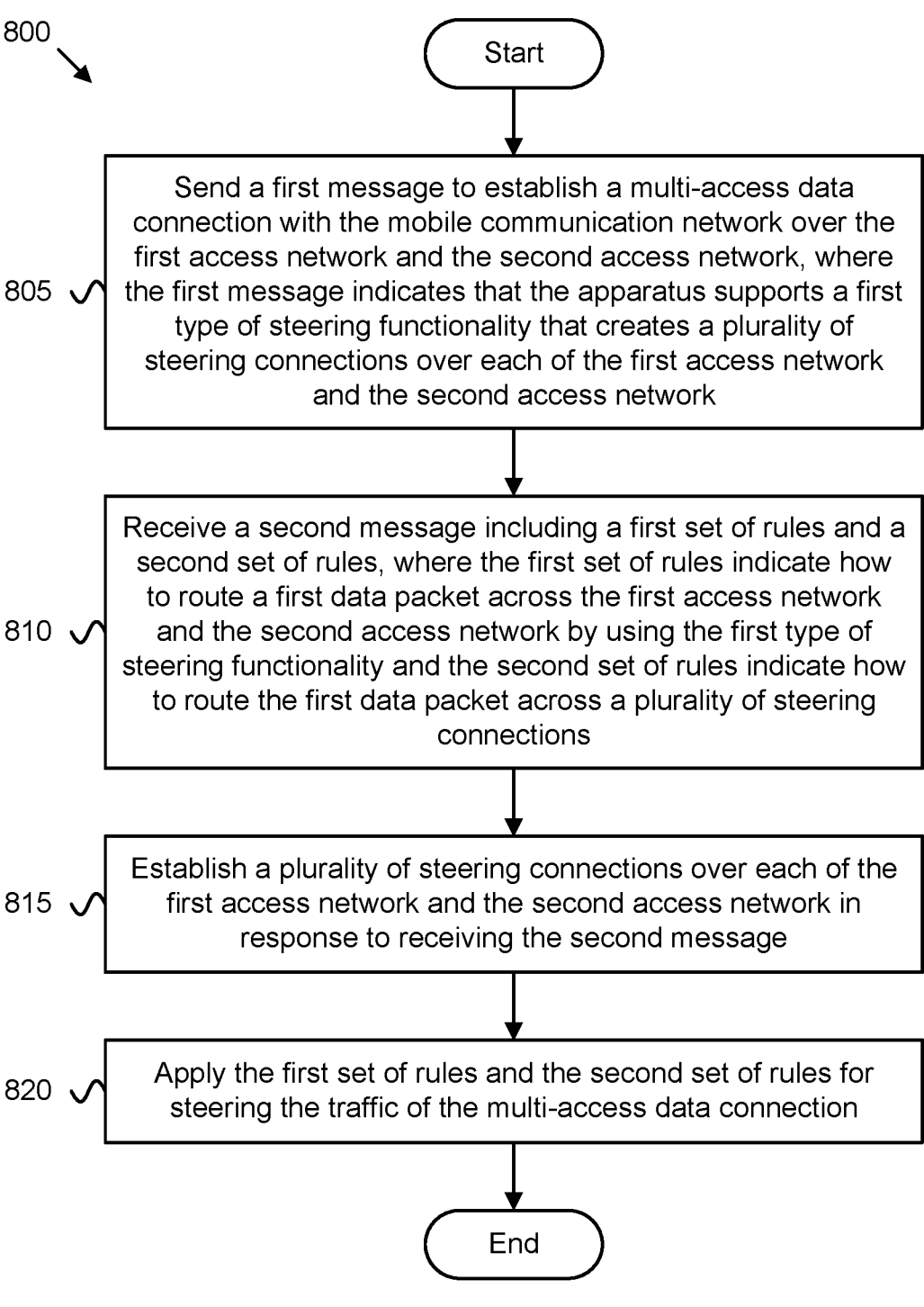

800

Start

805 — Send a first message to establish a multi-access data connection with the mobile communication network over the first access network and the second access network, where the first message indicates that the apparatus supports a first type of steering functionality that creates a plurality of steering connections over each of the first access network and the second access network 810 — Receive a second message including a first set of rules and a second set of rules, where the first set of rules indicate how to route a first data packet across the first access network and the second access network by using the first type of steering functionality and the second set of rules indicate how to route the first data packet across a plurality of steering connections 815 — Establish a plurality of steering connections over each of the first access network and the second access network in response to receiving the second message 820 — Apply the first set of rules and the second set of rules for steering the traffic of the multi-access data connection End

FIG. 8

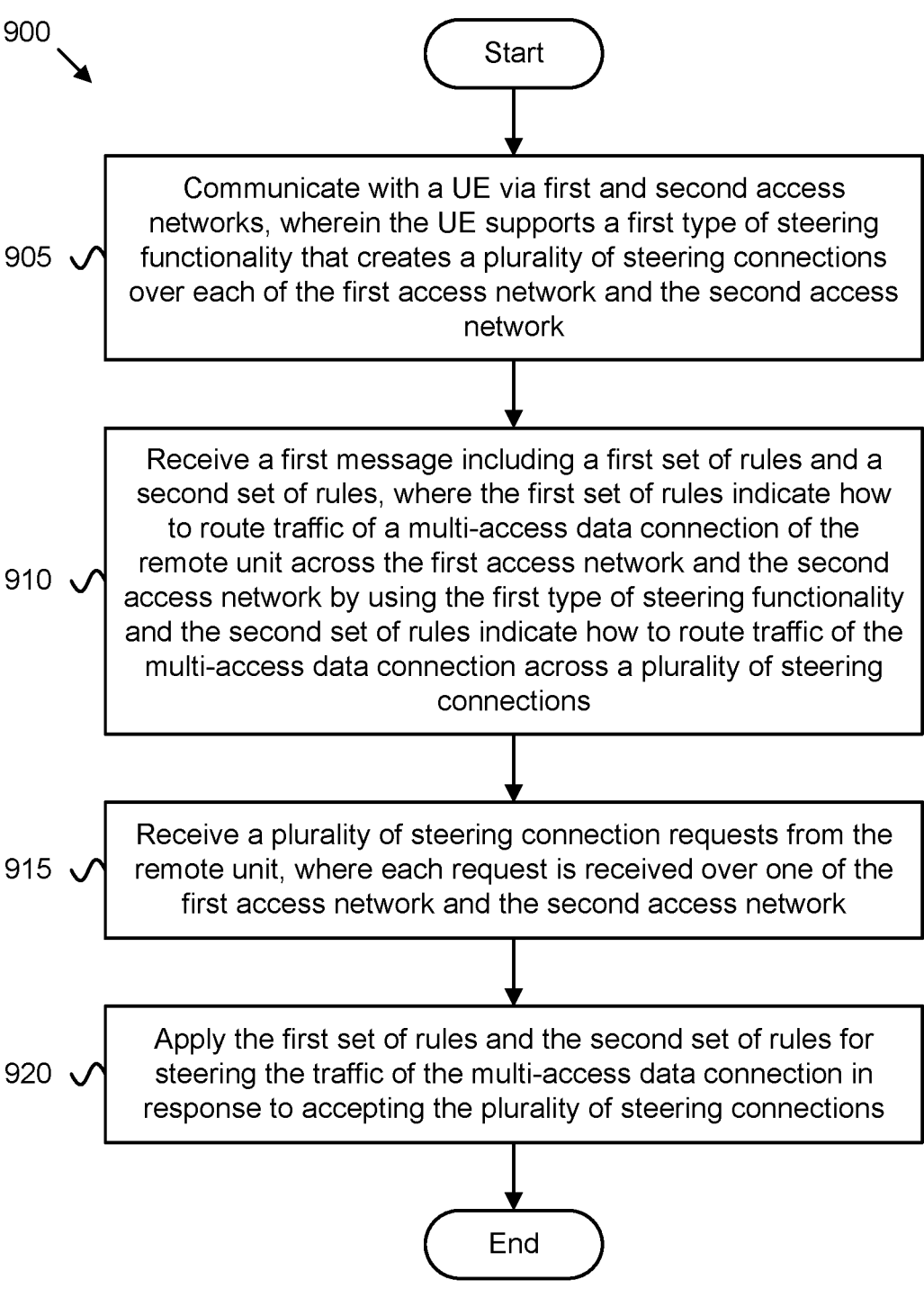

900

Start

905 — Communicate with a UE via first and second access networks, wherein the UE supports a first type of steering functionality that creates a plurality of steering connections over each of the first access network and the second access network 910 — Receive a first message including a first set of rules and a second set of rules, where the first set of rules indicate how to route traffic of a multi-access data connection of the remote unit across the first access network and the second access network by using the first type of steering functionality and the second set of rules indicate how to route traffic of the multi-access data connection across a plurality of steering connections 915 — Receive a plurality of steering connection requests from the remote unit, where each request is received over one of the first access network and the second access network 920 — Apply the first set of rules and the second set of rules for steering the traffic of the multi-access data connection in response to accepting the plurality of steering connections End

FIG. 9

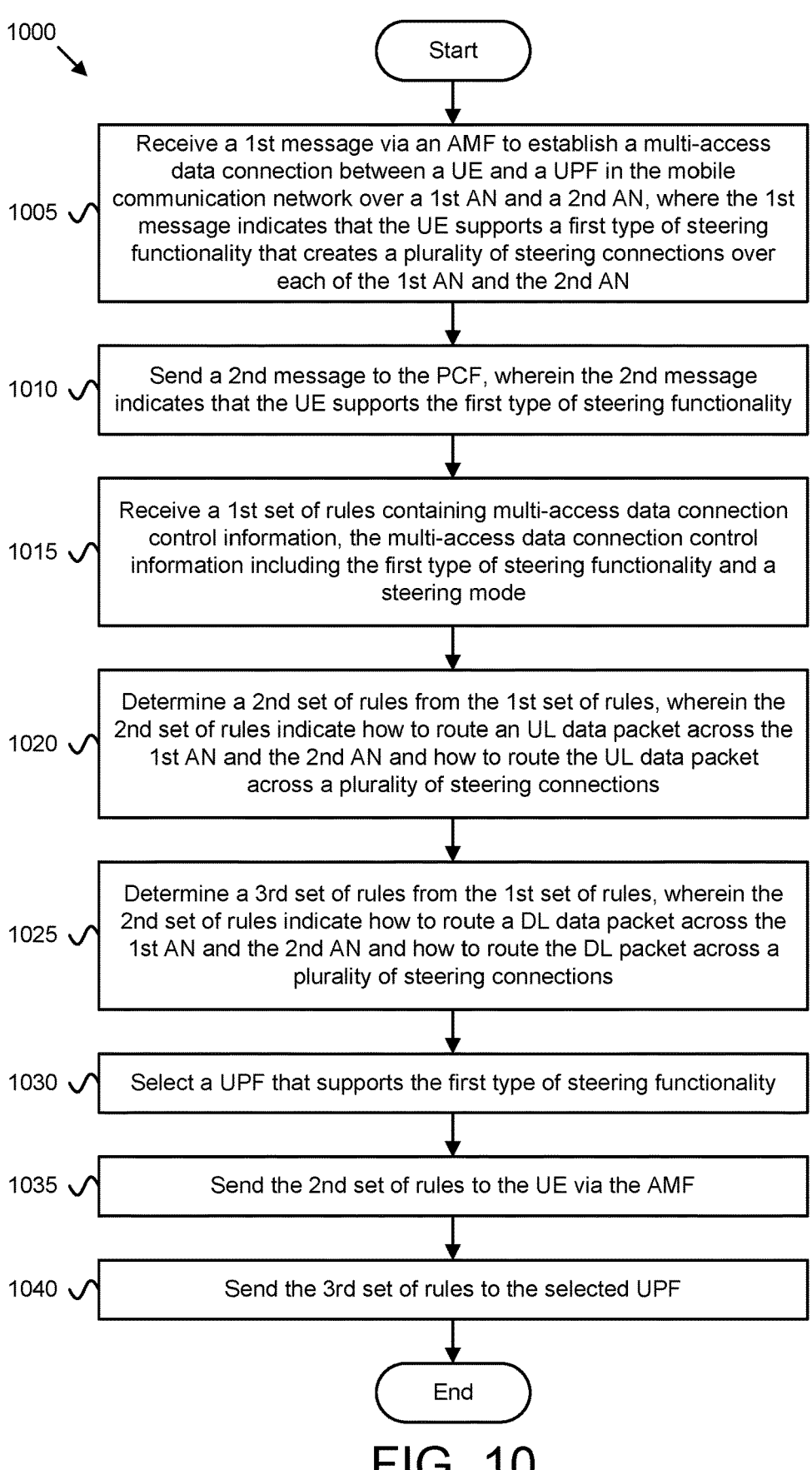

1000

Start

1005 Receive a 1st message via an AMF to establish a multi-access data connection between a UE and a UPF in the mobile communication network over a 1st AN and a 2nd AN, where the 1st message indicates that the UE supports a first type of steering functionality that creates a plurality of steering connections over each of the 1st AN and the 2nd AN 1010 Send a 2nd message to the PCF, wherein the 2nd message indicates that the UE supports the first type of steering functionality 1015 Receive a 1st set of rules containing multi-access data connection control information, the multi-access data connection control information including the first type of steering functionality and a steering mode 1020 Determine a 2nd set of rules from the 1st set of rules, wherein the 2nd set of rules indicate how to route an UL data packet across the 1st AN and the 2nd AN and how to route the UL data packet across a plurality of steering connections 1025 Determine a 3rd set of rules from the 1st set of rules, wherein the 2nd set of rules indicate how to route a DL data packet across the 1st AN and the 2nd AN and how to route the DL packet across a plurality of steering connections 1030 Select a UPF that supports the first type of steering functionality 1035 Send the 2nd set of rules to the UE via the AMF 1040 Send the 3rd set of rules to the selected UPF End

FIG. 10

ACCESS TRAFFIC STEERING USING A PLURALITY OF STEERING CONNECTIONS OVER DIFFERENT ACCESS NETWORKS

The subject matter disclosed herein relates generally to wireless communications and more particularly relates to using the QUIC protocol for low-layer access network traffic steering.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF", a network function in the 5GC), Access Point Name ("APN"), Access Stratum ("AS"), Access Network Information ("ANI"), Application Programing Interface ("API"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control Function ("PCF", a network function in the 5GC), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF", a network function in the 5GC), Transmission Control Protocol ("TCP"), Transmit ("Tx"), Unified Data Management ("UDM", a network function in the 5GC), User Entity/Equipment (Mobile Terminal) ("UE"), Uplink ("UL"), User Plane ("UP"), User Plane Function ("UPF", a network function in the 5GC), Universal Mobile Telecommunications System ("UMTS"), User Datagram Protocol ("UDP"), User Location Information ("ULI"), Wireless Local Area Network ("WLAN"), and Worldwide Interoperability for Microwave Access ("WiMAX").

Certain wireless systems support a feature called Access Traffic Steering, Switching and Splitting ("ATSSS"), which enables the establishment of a multi-access PDU ("MA PDU") session between a UE and a UPF, and the policy-controlled routing of the MA PDU Session traffic over two access networks. Essentially, an MA PDU Session is a data connection between a UE and a UPF that can transfer data traffic by using both a 3GPP access network (e.g., NR access or E-UTRA access) and a non-3GPP access network (e.g., Wi-Fi or wireline access).

BRIEF SUMMARY

Methods for steering the traffic of the multi-access data connection over a plurality of steering connections are disclosed. Apparatuses and systems also perform the functions of the methods.

One method of a UE for steering the traffic of the multi-access data connection over a plurality of steering connections includes sending a first message to establish a multi-access data connection with the mobile communication network over the first access network and the second access network, where the first message indicates that the apparatus supports a first type of steering functionality that creates a plurality of steering connections over each of the first access network and the second access network. The method includes receiving a second message including a first set of rules and a second set of rules, where the first set of rules indicate how to route a first data packet across the first access network and the second access network by using the first type of steering functionality and the second set of rules indicate how to route the first data packet across a plurality of steering connections. The method includes establishing a plurality of steering connections over each of the first access network and the second access network in response to receiving the second message and applying the first set of rules and the second set of rules for steering the traffic of the multi-access data connection.

One method of a UPF for steering the traffic of the multi-access data connection over a plurality of steering connections includes communicating with a UE via a first access network and via a second access network, wherein the remote unit supports a first type of steering functionality that creates a plurality of steering connections over each of the first access network and the second access network and receiving a first message at a UPF, the first message including a first set of rules and a second set of rules, where the first set of rules indicate how to route a first data packet of a multi-access data connection of the UE across the first access network and the second access network by using the first type of steering functionality and the second set of rules indicate how to route the first data packet of the multi-access data connection across a plurality of steering connections. The method includes receiving a plurality of steering connection requests from the UE, where each request is received over one of the first access network and the second access network and applying the first set of rules and the second set of rules for steering the traffic of the multi-access data connection in response to accepting the plurality of steering connections.

One method of an SMF for steering the traffic of the multi-access data connection over a plurality of steering connections includes receiving a first message via the AMF to establish a multi-access data connection between a UE and a UPF in the mobile communication network over a first access network and a second access network. Here, the first message indicates that the UE supports a first type of steering functionality that creates a plurality of steering connections over each of the first access network and the second access network. In one embodiment, the first message comprises a PDU Session Establishment Request and the first type of steering functionality is the QUIC-LL functionality described herein. The method includes sending a second message to the PCF. Here, the second message indicates that the remote unit supports the first type of steering functionality. In one embodiment, the second message comprises a SM Policy Control Create Request. The processor receives a first set of rules containing multi-access data connection control information, the multi-access data connection control information including the first type of steering functionality and a steering mode. The method includes determining a second set of rules from the first set of rules and determining a third set of rules from the first set of rules. The second set of rules indicate how to route an uplink data packet across the first access network and the second access network and how to route the uplink data packet across a plurality of steering connections and the third set of rules indicate how to route a downlink data packet across the first access network and the second access network and how to route the downlink packet across a plurality of steering connections. The method includes selecting a UPF that supports the first type of steering functionality, sends the second set of rules to the remote unit via the AMF, and sends the third set of rules to the selected UPF.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flow chart diagram illustrating one embodiment of a first method for steering the traffic of the multi-access data connection over a plurality of steering connections;

FIG. 9 is a flow chart diagram illustrating one embodiment of a second method for steering the traffic of the multi-access data connection over a plurality of steering connections; and FIG. 10 is a flow chart diagram illustrating one embodiment of a third method for steering the traffic of the multi-access data connection over a plurality of steering connections.

DETAILED DESCRIPTION

Figure 1:
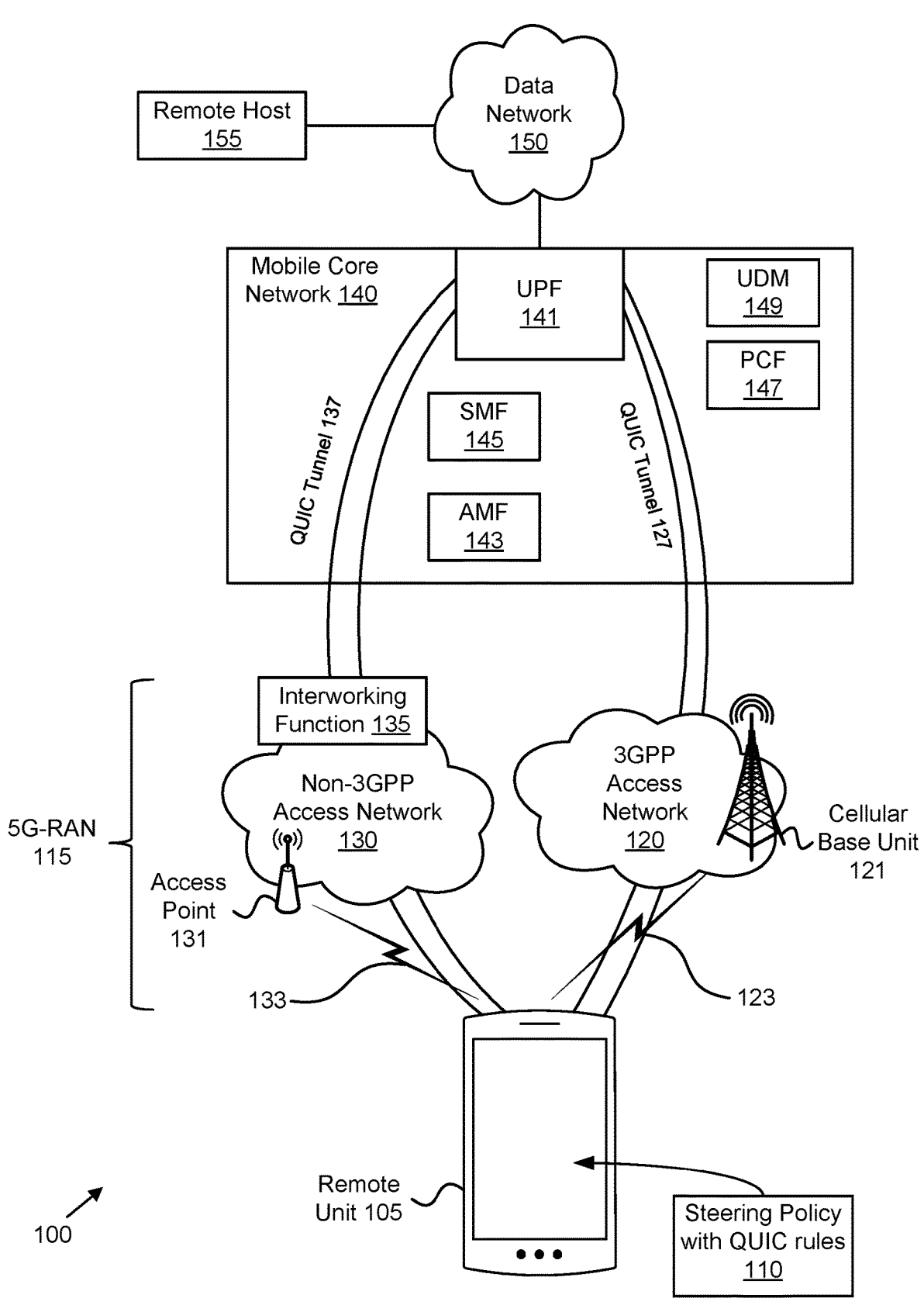
FIG. 1 is a diagram illustrating one embodiment of a wireless communication system for steering the traffic of the multi-access data connection over a plurality of steering connections.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for steering the traffic of the multi-access data connection over a plurality of steering connections. The 3GPP specs in Rel-16 define a feature called Access Traffic Steering, Switching and Splitting ("ATSSS"), which enables the establishment of a multi-access PDU ("MA PDU") session between a UE and a UPF, and the policy-controlled routing of the MA PDU Session traffic over two access networks. Essentially, an MA PDU Session is a data connection between a UE and a UPF that can transfer data traffic by using both a 3GPP access network (e.g., NR access or E-UTRA access) and a non-3GPP access network (e.g., Wi-Fi or wireline access). How the data traffic is routed across the two access networks is defined by a steering functionality and by a steering mode.

Currently, two steering functionalities have been defined in TS 23.501: (a) the Multi-Path TCP (MPTCP) steering functionality and (b) the ATSSS-Low Layer (ATSSS-LL) steering functionality. However, both MPTCP and ATSSS-LL experience several limitations. For example, the MPTCP steering functionality can be applied only to steer the traffic of TCP traffic, but cannot be applied to steer the traffic of non-TCP traffic. Also, the ATSSS-LL steering functionality is very simple but cannot measure the transmission delay of the two accesses, so it cannot steer the traffic to the access with the smallest delay unless an additional protocol is defined for delay measurements. While once such measurement protocol has been defined in 3GPP and is called the Performance Measurement Functionality (PMF), the additional protocol introduces a lot of complexity and transmission overhead.

To overcome these limitations and to improve the performance, the present disclosure specifies a new ATSSS low-layer steering functionality based on the QUIC protocol specified in draft-ietf-quic-transport-25 with the amendments to support sending and receiving unreliable datagrams, specified in draft-pauly-quic-datagram-05. This new steering functionality is termed as QUIC-Low Layer (QUIC-LL). The QUIC protocol is used between the UE and the UPF and it creates multiple QUIC connection over each access network, each QUIC connection used to carry the data traffic of a QoS flow.

FIG. 1 depicts a wireless communication system 100 for measuring RTT, according to embodiments of the disclosure. In one embodiment, the wireless communication system 100 includes at least one remote unit 105, a 5G-RAN 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host 155 via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and the data network 150 (e.g., remote host 155) using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other remote hosts.

Moreover, the remote unit 105 may establish a multi-access PDU session (i.e., multi-access data connection) with the mobile core network 140 whereby traffic of the multi-access PDU session is steered over one or both of the 3GPP access network 120 and/or a non-3GPP access network 130, according to steering rules. Additionally, a QUIC tunnel 127 containing a plurality of QUIC steering connections may be established over the 3GPP access network 120 for handling traffic of the multi-access PDU session. Similarly, a QUIC tunnel 137 containing a plurality of QUIC steering connections may be established over the non-3GPP access network 130 for handling traffic of the multi-access PDU session. Accordingly, the remote unit 105 may be configured with a steering policy 110 with QUIC rules for directing traffic to specific ones of the QUIC tunnels 127, 137.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the remote unit 105 and the mobile core network 140. In some embodiments, the interworking function 135 is a Non-3GPP Interworking Function ("N3IWF") and, in other embodiments, it is a Trusted Non-3GPP Gateway Function ("TNGF"). The N3IWF supports the connection of "untrusted" non-3GPP access networks to the mobile core network (e.g., 5GC), whereas the TNGF supports the connection of "trusted" non-3GPP access networks to the mobile core network. The interworking function 135 supports connectivity to the mobile core network 140 via the "N2" and "N3" interfaces, and it relays "N1" signaling between the remote unit 105 and the AMF 143. Both the 3GPP access network 120 and the interworking function 135 communicate with the AMF 143 using a "N2" interface. The interworking function 135 also communicates with the UPF 141 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least a UPF 141 that serves the 3GPP access network 120 and the non-3GPP access network 130. Note that in certain embodiments, the mobile core network may contain one or more intermediate UPFs, for example a first intermediate UPF that serves the non-3GPP access network 130 and the second intermediate UPF that serves the 3GPP access network 120. In such embodiments, the UPF 141 would be an anchor UPF receiving UP traffic of both intermediate UPFs.

The mobile core network 140 also includes multiple control plane functions including, but not limited to, an Access and Mobility Management Function ("AMF") 143 that serves both the 3GPP access network 120 and the non-3GPP access network 130, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC. In various embodiments, the mobile core network 140 may include a PMF (not shown) to assist the remote unit 105 and/or the UPF 141 in taking performance measurements over the two accesses, including latency measurements. In one embodiment, the PMF may be co-located with the UPF 141.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each slice may be identified using a S-NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

To improve steering functionality, the remote unit 105 may implement ATSSS low-layer steering functionality based on the QUIC protocol specified in draft-ietf-quic-transport-25 and the extensions specified in draft-pauly-quic-datagram-05, which support unreliable datagram transport over QUIC connections. This new steering functionality is referred to herein as "QUIC-Low Layer" or "QUIC-LL." The term "Low Layer" emphasizes the fact QUIC-LL operates below the IP layer, in contrast to a high layer steering functionality that operates above the IP layer (such as MPTCP).

The remote unit 105 may therefore establish a MA PDU Session with the UPF 141 that enables traffic steering across 3GPP and non-3GPP accesses using the QUIC-LL steering functionality (in short, an MA PDU Session using QUIC-LL). Additionally, after the establishment of the MA PDU Session using QUIC-LL, data traffic exchanged between the remote unit 105 and UPF 141 can be steered across the 3GPP and the non-3GPP accesses using the steering policy 110 with QUIC rules (and corresponding Multi-Access Rules with QUIC rules at the UPF 141).

Figure 2:
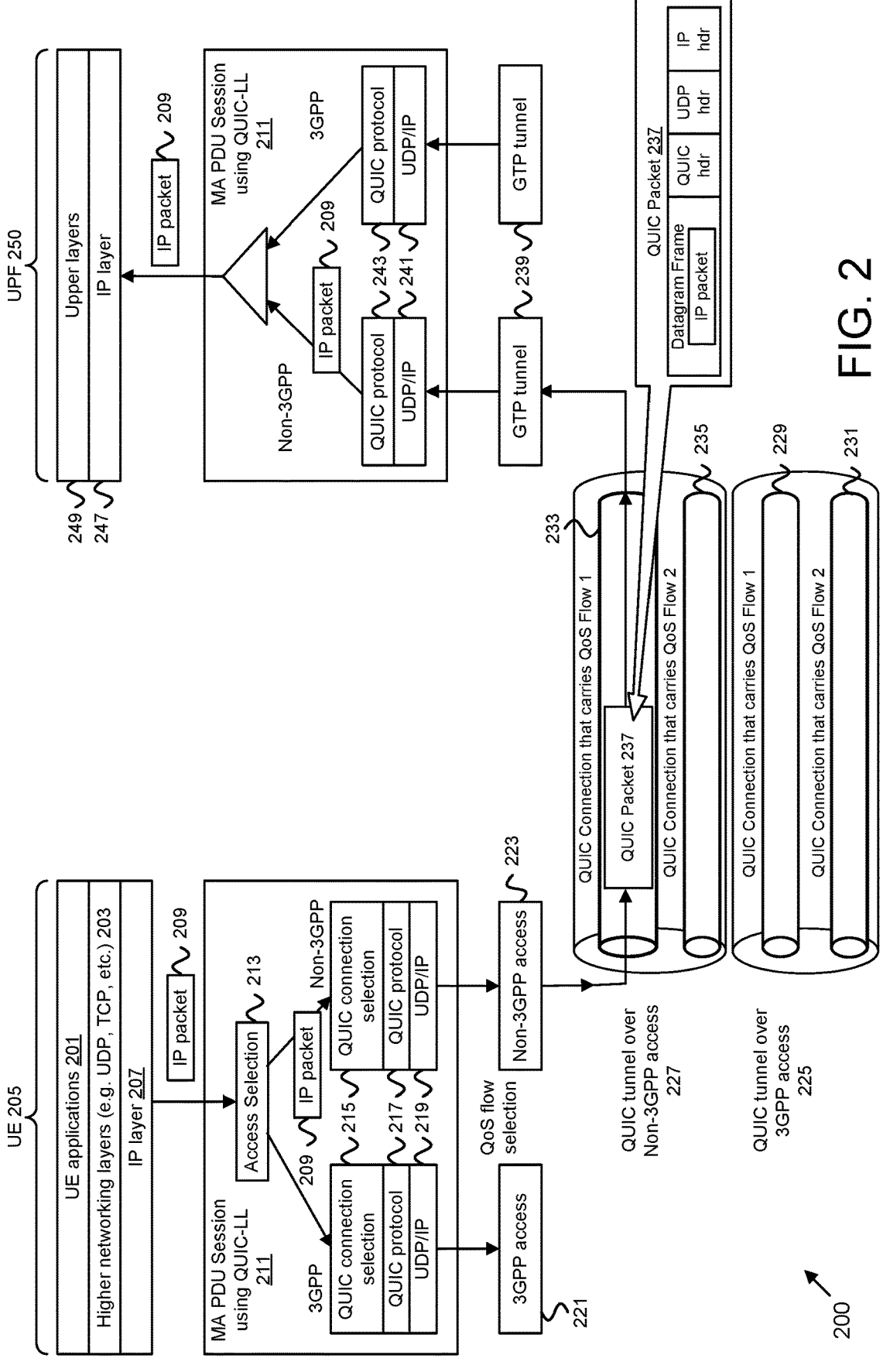
FIG. 2 is a diagram illustrating one embodiment of a network deployment for steering the traffic of the multi-access data connection over a plurality of steering connections.

FIG. 2 depicts a first network deployment 200 where data traffic is exchanged between a UE 205 (e.g., one embodiment of the remote unit 105) and a UPF 250 (e.g., one embodiment of the UPF 141) over a MA PDU Session using QUIC-LL. Essentially, a MA PDU Session using QUIC-LL 211 creates two QUIC tunnels between the UE and UPF: one QUIC tunnel over 3GPP access 225 and another QUIC tunnel over non-3GPP access 227. Each QUIC tunnel is composed of one or more QUIC connections and each QUIC connection is used to carry the traffic of a specific QoS flow.

The QUIC connections are established over each access right after the establishment of the MA PDU Session 211, assuming the UE 205 is registered over both accesses.

After the establishment of the MA PDU Session using QUIC-LL 211, the UE 205 is provisioned with 3 types of rules: ATSSS rules, QUIC rules and QoS rules. The QUIC rules can be separate from the ATSSS rules (as describes below with reference to FIG. 4), or they can be combined with the ATSSS rules (as describes below with reference to FIG. 5). For the sake of the following discussion, the QUIC rules are considered separate from the ATSSS rules.

When an IP packet 209 (or, in general, a Packet Data Unit ("PDU")) is generated in the UE 205 and is forwarded to the MA PDU Session using QUIC-LL 211 (as shown in FIG. 2), the packet 209 first goes through Access Selection 213 that is carried out based on the ATSSS rules. During this Access Selection 213 it is decided whether the IP packet 209 should be sent to UPF 250 via the 3GPP access 221 or via the non-3GPP access 223.

Next, the IP packet 209 goes through QUIC Connection Selection 215 where it is mapped to one QUIC connection on the selected access. In the depicted embodiment, the UE 205 selects the non-3GPP access 223, e.g., based on the ATSSS rules. Note that the same number of QUIC connections exists in each access and these QUIC connections are established right after the MA PDU Session is setup. Each QUIC connection is used to carry the traffic of a specific QoS flow. Thus, when N QoS flows are assigned to the MA PDU Session, the UE will request N QUIC connections over 3GPP access and N QUIC connections over non-3GPP access. The QUIC Connection Selection is based on the QUIC rules. In the depicted embodiment, the QUIC tunnel over 3GPP access 225 includes a first QUIC connection 229 that carries a first QoS Flow (QoS to Flow 1) and a second QUIC connection 231 that carries a second QoS Flow (QoS Flow 2). Similarly, the QUIC tunnel over non-3GPP access 227 includes a first QUIC connection 233 that carries a first QoS Flow (QoS Flow 1) and a second QUIC connection 235 that carries a second QoS Flow (QoS Flow 2).

After a QUIC connection is selected, the IP packet 209 is forwarded to this QUIC connection and goes through the normal processing of the QUIC protocol (e.g., at QUIC protocol layer 215). In the depicted embodiment, the UE 205 selects the first QoS flow 233 of the QUIC tunnel over non-3GPP access 227. During this processing of the QUIC protocol, the IP packet 209 is encapsulated in a QUIC Datagram Frame (specified in draft-pauly-quic-datagram-05) that is further included in a QUIC packet 237. Note that each QUIC packet may carry one or multiple QUIC Datagram Frames and/or other QUIC frame types, as specified in draft-ietf-quic-transport-25. Each QUIC packet is encapsulated in another IP packet (e.g., at UDP/IP layer 219) that is forwarded to a specific IP address and UDP port of the UPF 250. Note that each QUIC connection may be identified by the IP address and UDP port.

Finally, the created QUIC packet 237 is sent to the selected access interface (3GPP or non-3GPP) where it is mapped to a QoS flow based on the received QoS rules.

Note that the UPF 250 includes a GPRS Tunneling Protocol (GTP) tunnel 239 where the IP packet containing the QUIC packet 237 is received. The QUIC packet 237 is decapsulated from the IP packet at UDP/IP layer 241 and the IP packet 209 is decapsulated from the QUIC packet 237 at the QUIC protocol layer 243, after which it is delivered to IP layer 247 and its data delivered to the upper layers 249.

Figure 3A:
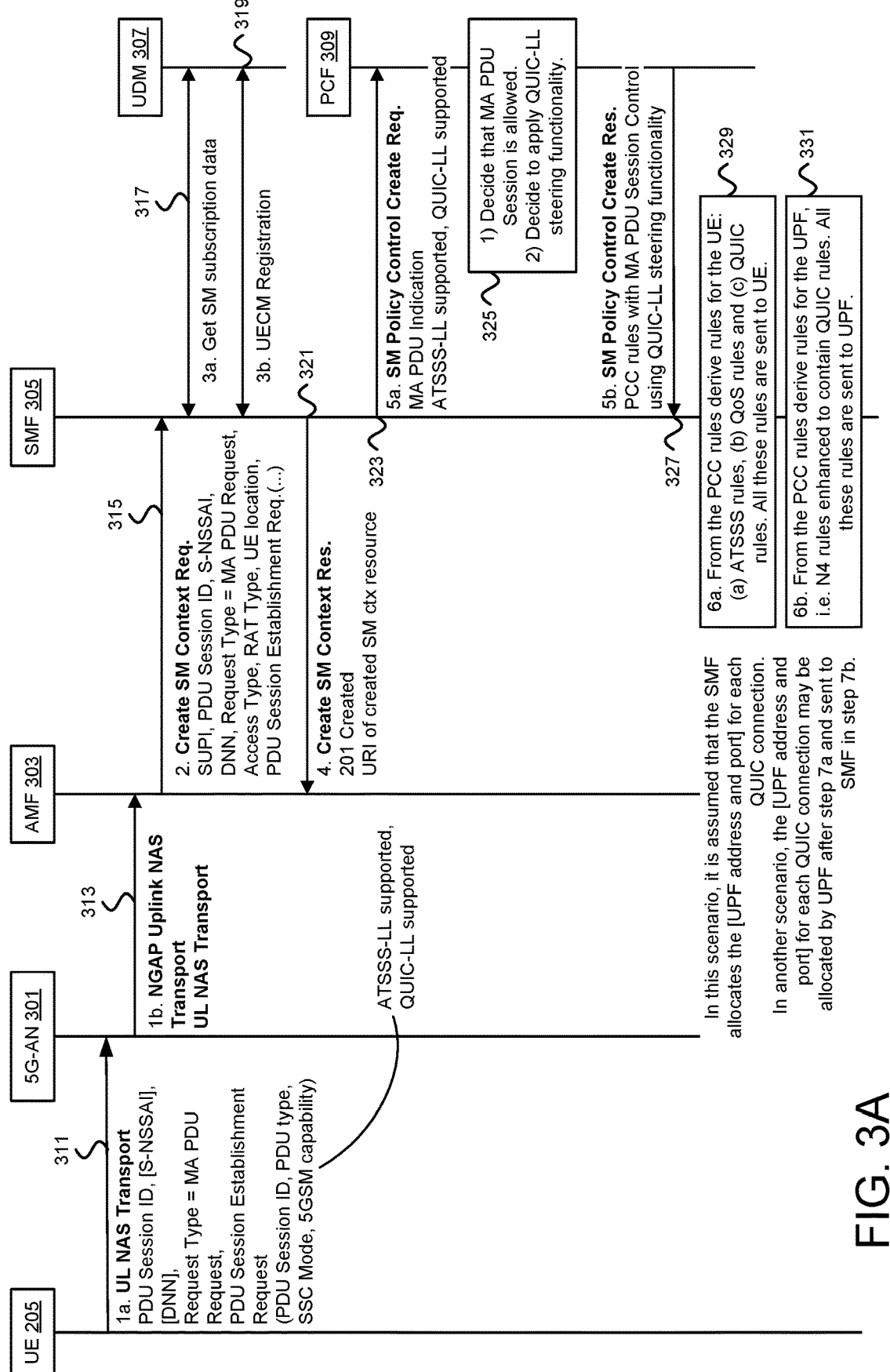
FIG. 3A is a signal flow diagram illustrating one embodiment of a procedure for establishing QUIC connections for access traffic steering.
Figure 3B:
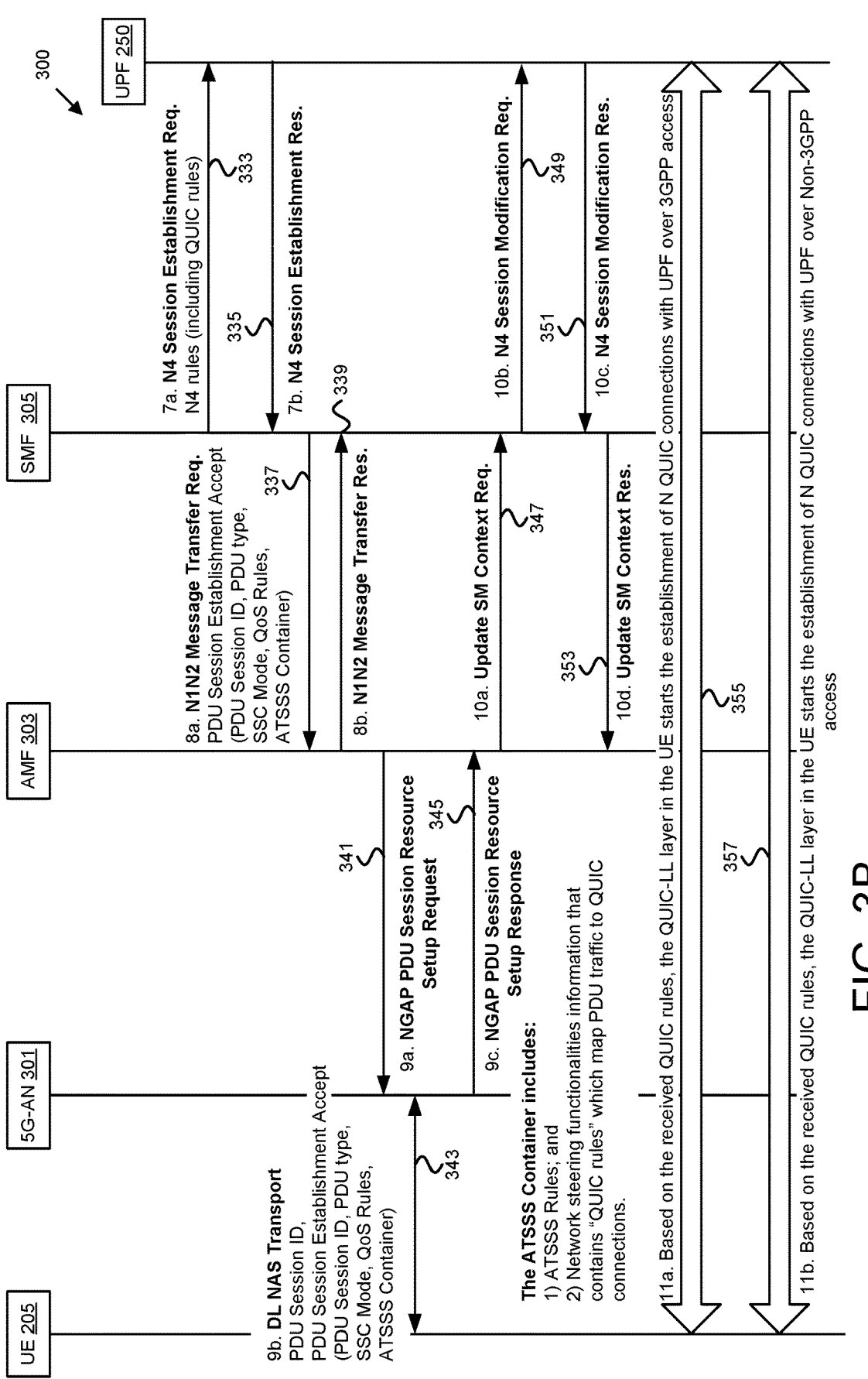
FIG. 3B is a continuation of the procedure depicted in FIG. 3A.

FIGS. 3A-3B depict a procedure 300 for steering the traffic of the multi-access data connection over a plurality of steering connections, according to embodiments of the disclosure. The procedure 300 involves the UE 205, a 5G Access Network ("5G-AN") 301, an AMF 303 (e.g., one embodiment of the AMF 143), a SMF 305 (e.g., one embodiment of the SMF 145), a UDM 307 (e.g., one embodiment of the UDM 149), a PCF 309 (e.g., one embodiment of the PCF 147), and the UPF 250.

Referring to FIG. 3A, the procedure 300 begins at Step 1*a* when, to request the establishment of a MA PDU Session, the UE 205 sends an UL NAS Transport message with Request Type=MA PDU Request and with an embedded PDU Session Establishment Request message, which includes the ATSSS capabilities of the UE 205 in the SGSM Capability information element (see messaging 311).

As an example, the ATSSS capabilities of the UE 205 may indicate that the UE 205 supports the ATSSS-LL steering functionality defined in TS 23.501, and/or the new QUIC-LL steering functionality. In other examples, the UE 205 may indicate also that it supports the MPTCP steering functionality defined in TS 23.501. At Step 1*b*, the UL NAS Transport message is forwarded by the 5G Access Network to the AMF within an NGAP Uplink NAS Transport message (see messaging 313).

At Step 2, based on the Request Type=MA PDU Request, the AMF 303 determines that this is a request for a MA PDU Session and selects an SMF 305 that supports MA PDU Sessions. Subsequently, the AMF 303 sends a Create SM Context Request message to the selected SMF 305 that contains the received PDU Session Establishment Request, which includes the SGSM Capability information element (see messaging 315).

At Step 3, the SMF 305 performs the regular interactions with the UDM 307, e.g., to receive Session Management (SM) subscription data for the UE (see messaging 317) and to register itself as being the serving SMF 305 for the requested PDU Session (see messaging 319).

At Step 4, the SMF 305 creates the SM context requested in step 2 and returns a response to the AMF 303 (see messaging 321).

At Step 5, the SMF 305 selects a PCF 309 and initiates the establishment of a SM Policy Association by sending an SM Policy Control Create Request to the selected PCF 309 (see messaging 323). This request triggers the PCF 309 to create SM policy for the PDU Session, i.e., rules (called PCC rules) that define how the various data flows of the PDU Session will be charged, what QoS they will experience, how they will be routed across 3GPP access and non-3GPP access, etc. In the depicted embodiment, the SM Policy Control Create Request includes an MA PDU Indication, as well as the ATSSS capabilities of the UE (e.g., ATSSS-LL supported and/or QUIC-LL supported), received by SMF 305 in step 2.

The PCF 309 decides whether the requested MA PDU Session is allowed and, if it is, it decides how the various data flows transferred on the PDU Session will be routed across 3GPP access and non-3GPP access. In one example, the PCF 309 decides to route the data flows across 3GPP access and non-3GPP access by applying the QUIC-LL steering functionality supported by the UE 205. In this case, the PCF 309 may provide PCC rules to SMF 305 (in step 5*b*) that include MA PDU Session Control information, such as the following rules in Table 1:

TABLE 1

| PCC Rule 1: | This PCC rule specifies that all data |
| Precedence = 1 | packets with destination IP address = |

TABLE 1-continued

| Service Data Flow Template 1: | a.b.c.d should be transferred by using |
| --- | --- |
| Dest. IP address = a.b.c.d | certain QoS parameters (5QI = 1, |
| Policy control: | ARP = 1) and should be routed across |
| 5QI = 1, ARP = 1 | 3GPP access and non-3GPP access by |
| MA PDU Session Control: | applying the QUIC-LL steering |
| Steering functionality = QUIC-LL | functionality and an "active/standby" |
| Steering mode = active/standby | steering mode, where the active access |
| (active = 3GPP) | is the 3GPP access. |
| PCC Rule 2: | This PCC rule specifies that all data |
| Precedence = 2 | packets of application with identity |
| Service Data Flow Template 2: | "com.example.app" should be |
| App Identity = com.example.app | transferred by using certain QoS |
| Policy control: | parameters (5QI = 2, ARP = 2) and |
| 5QI = 2, ARP = 2 | should be routed across 3GPP access |
| MA PDU Session Control: | and non-3GPP access by applying the |
| Steering functionality = QUIC-LL | QUIC-LL steering functionality and a |
| Steering mode = smallest delay | "smallest delay" steering mode (i.e., |
| | they should be transferred on the access |
| | with the smallest measured delay). |

At Step 6, from the PCC rules received by PCF 309, the SMF 305 derives rules for the UE 205 (see block 329). Here, the rules for the UE 205 contain either: (a) ATSSS rules, (b) QUIC rules and (c) QoS rules, as discussed below with reference to FIG. 4; or (a) ATSSS rules QUIC Connection Selection information and (b) QoS rules, as discussed below with reference to FIG. 5. Additionally, the SMF 305 uses the PCC rules to derive rules for the UPF 250, referred to as N4 rules, that contain QUIC Connection Selection information (see block 331).

The rules for the UE 205 are used by the UE 205 to determine (a) how to route an uplink data packet across 3GPP and non-3GPP accesses (ATSSS rules), (b) how to select the QUIC connection that should be used to transfer the uplink data packet (QUIC rules) and (c) the QoS flow that should be used to transfer the uplink data packet (QoS rules). The N4 rules include Multi-Access Rules (MAR) that are used by the UPF 250 to determine the same information but for the downlink packets. The N4 rules are enhanced (over the present N4 rules) to contain also QUIC Connection Selection rules (referred to as QUIC rules) for selecting the QUIC connection that should be used to transfer a downlink data packet.

Continuing on FIG. 3B, at Step 7 the SMF 305 selects a UPF 250 and creates an N4 Session with this UPF 250. In the N4 Session Establishment Request message the SMF 305 includes the derived N4 rules that contain QUIC rules, which are used for selecting a QUIC connection for every downlink data packet (see messaging 333). As noted above, the couple [IP address, UDP port] identifies a QUIC connection refers to an IP address and a UDP port on the UPF side. This couple for each QUIC connection is either allocated by the SMF 305, or is allocated by the UPF 250 itself and is provided to SMF 305 in step 7*b* (see messaging 335). In this latter case, the SMF 305 derives the QUIC rules after the completion of step 7.

Figure 4:
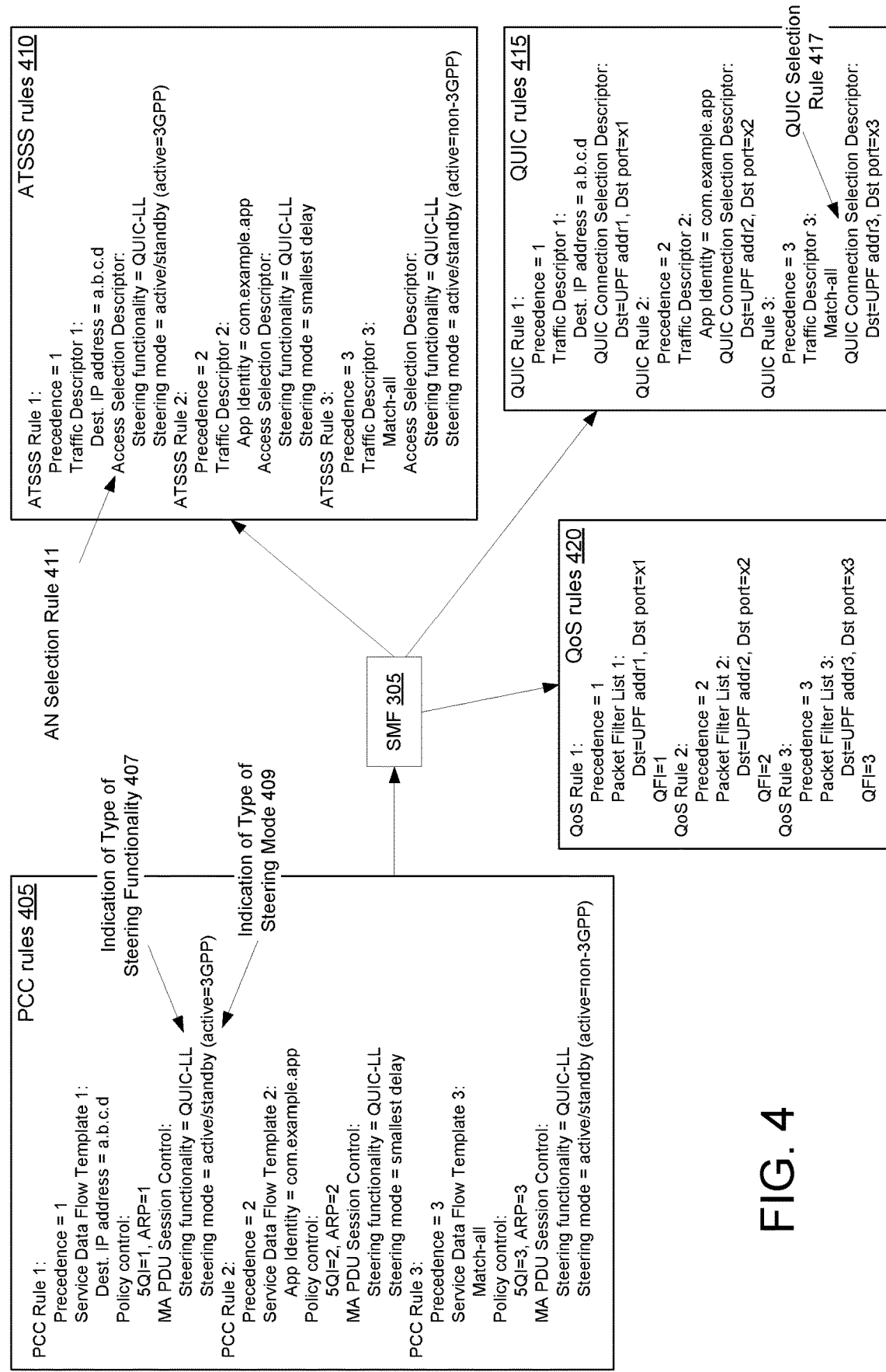
FIG. 4 is a block diagram illustrating derivation of ATSSS rules and QUIC Connection rules.
Figure 5:
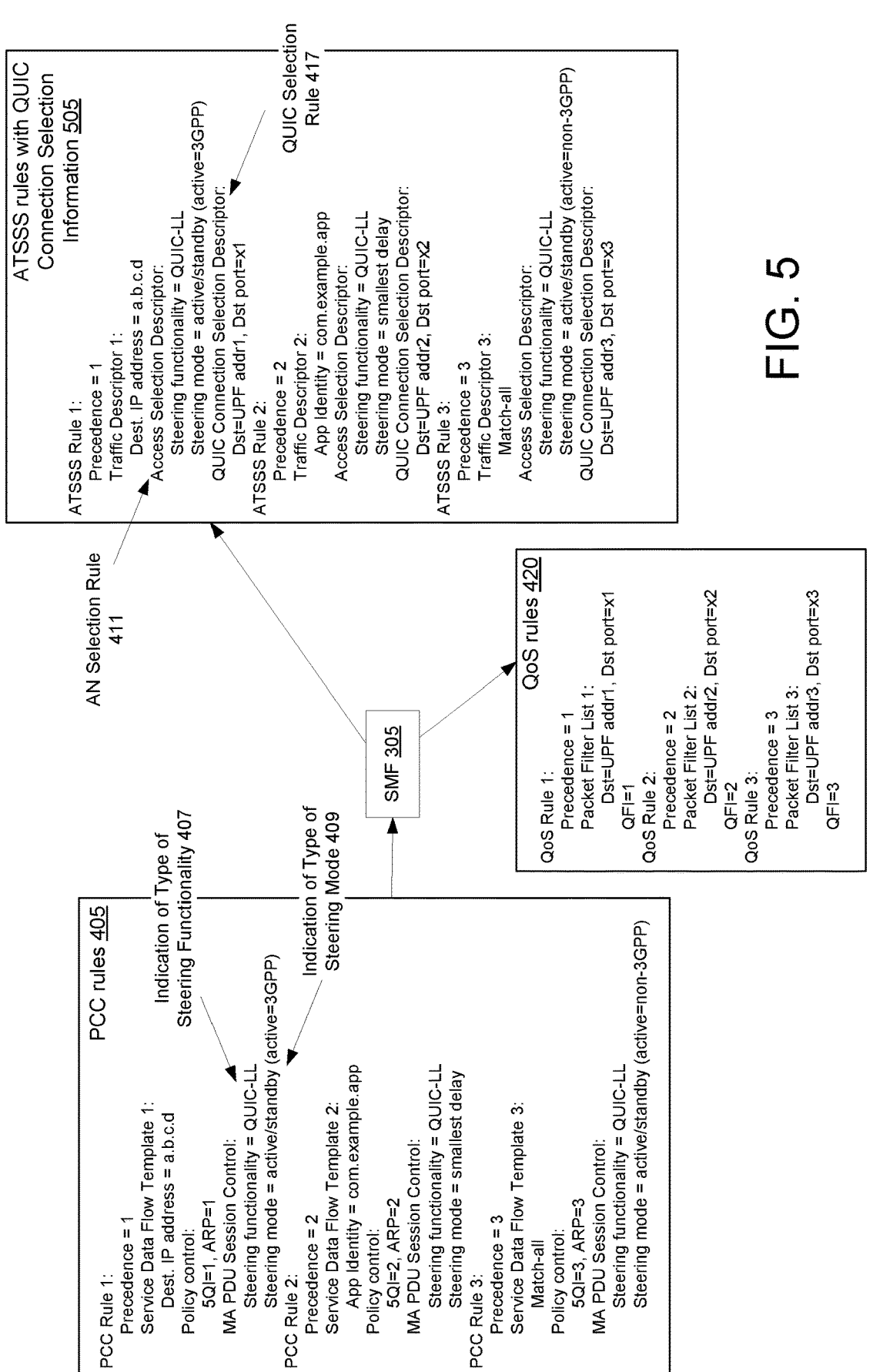
FIG. 5 is a block diagram illustrating derivation of ATSSS rules with QUIC Connection Selection Information.

At Step 8*a*, the SMF 305 creates a PDU Session Establishment Accept message for the UE 205 and encapsulates this message into an N1N2 Message Transfer Request that is sent to the AMF 303 (see messaging 337). The PDU Session Establishment Accept contains the QoS rules derives by the SMF 305 and an ATSSS Container (defined in TS 24.501) which contains either (a) separate ATSSS rules and QUIC rules (as shown in FIG. 4), or (b) the ATSSS rules with QUIC Connection Selection information (as shown in FIG. 5). The AMF 303 sends an N1N2 Message Transfer Request (see messaging 339).

At Step 9*a*, the normal NGAP PDU Session Resource Setup procedure is executed between the AMF 303 and the 5G-AN 301. The PDU Session Establishment Accept message is embedded in the NGAP PDU Session Resource Setup Request message (see messaging 341).

At Step 9*b*, a DL NAS Transport message is sent to the UE 205 which contains the PDU Session Establishment Accept message (see messaging 343). Because the UE 205 receives an ATSSS Container including ATSSS rules (with or without separate QUIC rules), the UE 205 determines that its MA PDU Session establishment request was accepted by the network. The 5G-AN 301 completes the NGAP PDU Session Resource Setup procedure by sending a NGAP PDU Session Resource Setup Response message to the AMF 303 (see messaging 345).

At Step 10*a*, the AMF 303 forwards N2 SM information (e.g., PDU Session ID, AN Tunnel Info, List of accepted/rejected QFI(s), etc.) received from the 5G-AN 301 in the to the SMF 305 (see messaging 347). At Step 10*b*, the SMF 305 initiates an N4 Session Modification procedure with the UPF 250 (see messaging 349). The SMF 305 provides AN Tunnel Info to the UPF 250 as well as the corresponding forwarding rules. At Step 10*c*, the UPF 250 provides an N4 Session Modification Response to the SMF 305 (see messaging 351). After this step, the UPF 250 delivers any down-link packets to the UE 205 that may have been buffered for this PDU Session. At Step 10*d*, the SMF 305 sends an UpdateSMContext Response to the AMF 303 (see message in 353). Here, the SMF 305 may subscribe to the UE mobility event notification from the AMF 303.

At Step 11*a*, the UE 205 initiates the establishment of N QUIC connections with the UPF 250 over 3GPP access (see block 355). At Step 11*b*, the UE 205 initiates the establishment of N QUIC connections with the UPF 250 over non-3GPP access (see block 357). Refer to FIG. 2, which depicts one QUIC tunnel over 3GPP access and another QUIC tunnel over non-3GPP access, where each QUIC tunnel is composed of one or more QUIC connections and each QUIC connection is used to carry the traffic of a specific QoS flow. The number of QUIC connections (N) is determined from the received QUIC rules (e.g., one QUIC connection per QUIC rule) or from the received the ATSSS rules with QUIC Connection Selection information. Each QUIC connection is initiated towards a specific [IP address, UDP port] couple.

After the establishment of the MA PDU Session using QUIC-LL, the UE 205 applies the received rules (in step 9*b*) to carry out the user-plane procedure discussed above with reference to FIG. 2. In particular, the UE 205 applies the rules received in the ATSSS Container to determine, for each uplink data packet that must be sent via the established MA PDU Session, (a) the access over which the data packet should be sent and (b) the QUIC connection over which it should be sent. Also, the UE 205 applies the received QoS rules to determine the QoS flow over which the data packet should be sent. Note that the UPF 250 applies the rules received in the N4 Rules to determine, for each downlink data packet that must be sent via the established MA PDU Session, (a) the access over which the data packet should be sent and (b) the QUIC connection over which it should be sent.

FIG. 4 depicts a first derivation 400 by the SMF 305 of steering policy including QUIC rules. The SMF 305 receives PCC rules 405 from a PCF (e.g., PCF 309), as discussed above with reference to FIG. 2, Step 5*b*. The SMF 305 then derives the ATSSS rules 410, the QUIC rules 415 and the QoS rules 420 from the PCC rules 405. As depicted, each PCC rule 405 includes an indication of a type of steering functionality 407 and an indication of a steering mode 409.

Each ATSSS rule 410 has a Traffic Descriptor component, which identifies the data traffic that matches this rule, and an Access Selection Descriptor component (e.g., AN selection rule 411), which identifies how this data traffic should be routed across 3GPP and non-3GPP accesses. The Access Selection Descriptor indicates a steering functionality that should be used, as well as a steering mode. The steering functionality identifies the function that should be used for data traffic steering (or routing), such as the QUIC-LL defined in this disclosure, while the steering mode identifies how the data traffic should be steered, e.g., that it should be steered to the active access if available, or to the access with the smallest delay, etc.

Each QUIC rule 415 has a Traffic Descriptor component, which identifies the data traffic that matches this rule, and a QUIC Connection Selection Descriptor component (e.g., QUIC connection selection rule 417), which identifies the QUIC connection via which the data traffic should be sent. The QUIC connection itself is identified with the couple [IP address, UDP port], i.e., with the IP address and the UDP port on the UPF side where the QUIC connection is established to. Alternatively, the QUIC connection can be identified by other means, such as a QUIC connection identifier.

Each QoS rule 420 has a Packet Filter List component, which identifies the data traffic that matches this rule, and a QoS Flow Identity (QFI) component, which identifies the QoS flow (i.e., the QoS parameters) that should be used to transfer this data traffic. Note from FIG. 4 that each QoS rule matches the data traffic of a single QUIC connection via the couple [IP address, UDP port], thus, one QoS flow is used to transfer the traffic of one QUIC connection. In other words, there is one-to-one mapping between QoS flows and QUIC connections.

FIG. 5 depicts a second derivation 500 by the SMF 305 of steering policy including QUIC rules. The SMF 305 receives PCC rules 405 from a PCF (e.g., PCF 309), as discussed above with reference to FIG. 2, Step 5*b*. The SMF 305 then derives combined ATSSS and QUIC rules and the QoS rules 420 from the PCC rules 405.

As compared to FIG. 4, in the second derivation 500 the SMF 305 combines the ATSSS rules 410 and the QUIC rules 415 into a common set of rules, called ATSSS rules with QUIC Connection Selection information 505. This is possible because both the ATSSS rules 410 and the QUIC rules 415 have the same Traffic Descriptors. An example showing how the SMF 305 derives the ATSSS rules with QUIC Connection Selection information 505 and the QoS rules 420 is shown in FIG. 5. In the depicted embodiment, the ATSSS rules with QUIC Connection Selection information 505 contain the existing components of the ATSSS rules defined in TS 23.501 (i.e., the Traffic Descriptor and the Access Selection Descriptor (e.g., AN selection rule 411)) plus a new component, the QUIC Connection Selection Descriptor (e.g., QUIC connection selection rule 417), which identifies the QUIC connection that should be used to carry the data traffic that matches the Traffic Descriptor. The QUIC connection itself is identified with the couple [IP address, UDP port], i.e., with the IP address and the UDP port on the UPF side where the QUIC connection is established to. Alternatively, the QUIC connection can be identified by other means, such as a QUIC connection identifier.

The ATSSS rules with QUIC Connection Selection information 505 specify how to route an uplink data packet across 3GPP and non-3GPP accesses and how to select the QUIC connection for this uplink data packet, while the QoS rules specify the QoS flow (i.e., the QoS parameters) that should be used to transfer the uplink data packet; see the QoS Flow Identity ("QFI").

Figure 6:
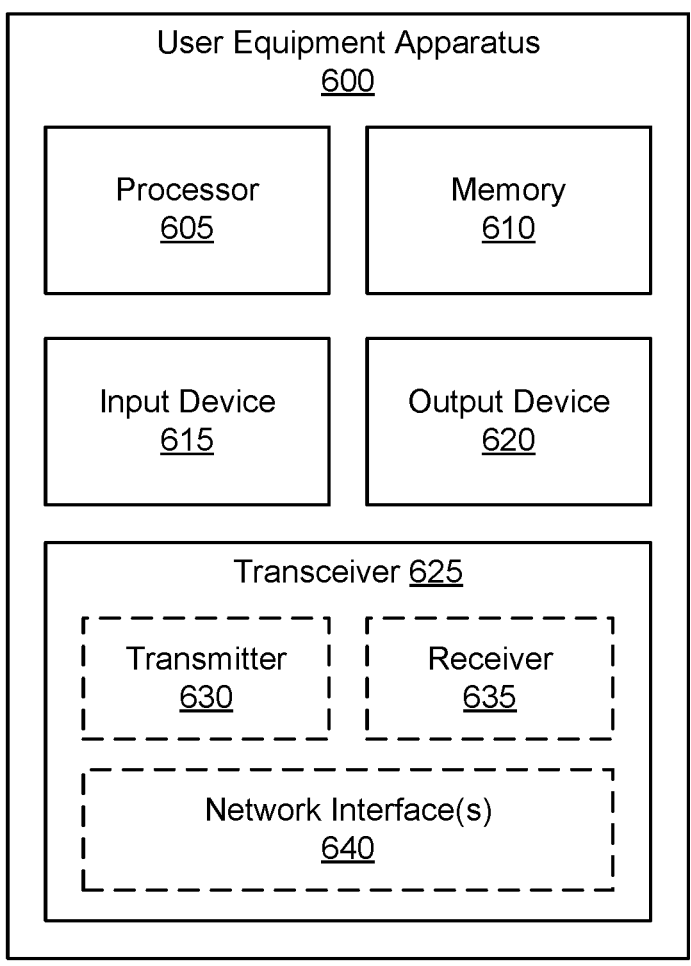
FIG. 6 is a block diagram illustrating one embodiment of a user equipment apparatus for steering the traffic of the multi-access data connection over a plurality of steering connections.

FIG. 6 depicts one embodiment of a user equipment apparatus 600 that may be used for steering the traffic of the multi-access data connection over a plurality of steering connections, according to embodiments of the disclosure. The user equipment apparatus 600 may be one embodiment of the remote unit 105 and/or the UE 205. Furthermore, the user equipment to apparatus 600 may include a processor 605, a memory 610, an input device 615, an output device 620, a transceiver 625. In some embodiments, the input device 615 and the output device 620 are combined into a single device, such as a touch screen. In certain embodiments, the user equipment apparatus 600 does not include any input device 615 and/or output device 620.

As depicted, the transceiver 625 includes at least one transmitter 630 and at least one receiver 635. Here, the transceiver 625 communicates with a mobile core network (e.g., a 5GC) via one or more access networks. Additionally, the transceiver 625 may support at least one network interface 640. Here, the at least one network interface 640 facilitates communication with an eNB or gNB (e.g., using the "Uu" interface). Additionally, the at least one network interface 640 may include an interface used for communications with an AMF, an SMF, and/or a UPF.

In some embodiments, the transceiver 625 comprises a first transceiver that communicates with a mobile communication network via a first access network and a second transceiver that communicates with the mobile communication network via a second access network. In other embodiments, the transceiver 625 comprises a first functionality (e.g., modem) for communicating with the mobile communication network via the first access network and a second functionality (e.g., modem) for communicating with the mobile communication network via the second access network.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 sends a first message (e.g., a PDU Session Establishment Request) to establish a multi-access data connection with the mobile communication network over the first access network and the second access network, where the first message indicates that the apparatus supports a first type of steering functionality (e.g., QUIC-LL) that creates a plurality of steering connections (e.g., QUIC connections) over each of the first access network and the second access network.

The processor 605 receives a second message (e.g., a PDU Session Establishment. Accept message) including a first set of rules (e.g., ATSSS rules) and a second set of rules (e.g., QUIC rules), where the first set of rules indicate how to route a first data packet across the first access network and the second access network by using the first type of steering functionality and the second set of rules indicate how to route the first data packet across a plurality of steering connections. Alternatively, the processor 605 may receive a combined set of rules formed from the first and second set of rules (for example, see the "ATSSS rules with QUIC Connection Selection information 505, described above). Here, a rule in the combined set of rules includes a steering mode (e.g., QUIC-LL) and indicates via which steering connection the first data packet is to be routed. The steering mode indicates via which access network the first data packet is to be routed.

The processor 605 establishes a plurality of steering connections (e.g., QUIC connections) over each of the first access network and the second access network in response to receiving the second message and the processor 605 applies the first set of rules and the second set of rules for steering the traffic of the multi-access data connection. In some embodiments, steering the traffic of the multi-access data connection comprises selecting an access network using the first set of rules and selecting a steering connection over the selected access network using the second set of rules. Where the combined set of rules is received, the processor 605 applies the combined set of rules for steering the traffic of the multi-access data connection. Here, the processor 605 steers the traffic of the multi-access data connection by selecting an access network and selecting a steering connection over the selected access network using the combined set of rules.

In certain embodiments, the processor 605 encapsulates traffic of the multi-access data connection within a QUIC datagram frame in response to selecting the steering connection. In some embodiments, each steering connection is associated with a QoS flow.

In some embodiments, each steering connection terminates in a common UPF. In certain embodiments, each steering connection uses a different UDP port at the common UPF. In certain embodiments, each steering connection uses a different IP address of the common UPF. In some embodiments, the first type of steering functionality is based on the QUIC protocol, wherein each of the plurality of steering connections corresponds to a different QUIC connection between the apparatus and the common UPF.

In some embodiments, the steering connections are established according to information in the second set of rules. In various embodiments, a rule in the first set of rules includes a steering mode, the steering mode indicating via which access network the first data packet is to be routed, and wherein a rule in the second set of rule indicates via which steering connection the first data packet is to be routed.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to steering the traffic of the multi-access data connection over a plurality of steering connections, for example storing ANI, IP addresses, and the like. In certain embodiments, the memory 610 also stores program code and related data, such as an operating system ("OS") or other controller algorithms operating on the user equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same to hardware chip or in a multi-chip module.

Figure 7:
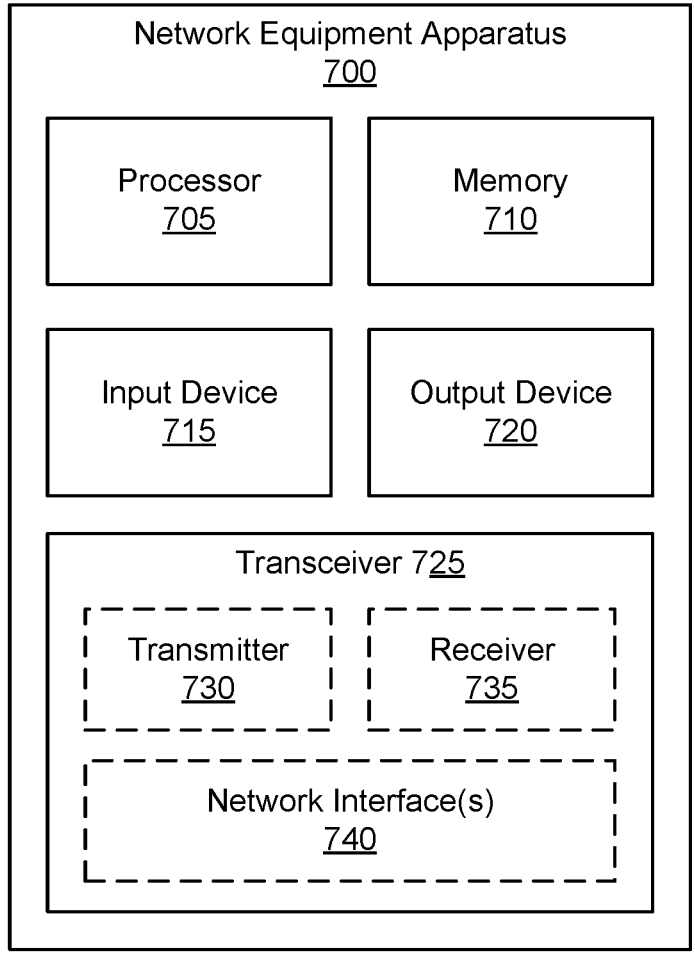
FIG. 7 is a block diagram illustrating one embodiment of a network equipment apparatus for steering the traffic of the multi-access data connection over a plurality of steering connections.

FIG. 7 depicts one embodiment of a network equipment apparatus 700 that may be used for steering the traffic of the multi-access data connection over a plurality of steering connections, according to embodiments of the disclosure. In some embodiments, the network equipment apparatus 700 may implement a UPF. In other embodiments, the network equipment apparatus 700 may implement a SMF. Furthermore, network equipment apparatus 700 may include a processor 705, a memory 710, an input device 715, an output device 720, a transceiver 725. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740. In some embodiments, the transceiver 725 supports a first interface for communicating with a RAN node, a second interface for communicating with one or more network functions in a mobile core network (e.g., a 5GC) and a third interface for communicating with a remote unit (e.g., UE).

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the first transceiver 725.

In various embodiments, the network equipment apparatus 700 operates as a UPF. In such embodiments, the processor 705 communicates with a UE via different access networks, i.e., via a first access network and a second access network. Here, the UE supports a first type of steering functionality (e.g., QUIC-LL) that creates a plurality of steering connections (e.g., QUIC connections) over each of the first access network and the second access network, receive a first message (e.g., N4 Session Establishment Request) including a first set of rules (e.g., AN selection rules) and a second set of rules (e.g., QUIC connection selection rules). Here, the first set of rules (e.g., Multi-Access rules, MARs) indicate how to route (e.g., downlink) traffic of a multi-access data connection of the remote unit across the first access network and the second access network by using the first type of steering functionality. Note that the ATSSS rules are sent only to UE. The associated rules sent to UPF are called MARs. The second set of rules (e.g., QUIC rules) indicate how to route the (e.g., downlink) traffic of the multi-access data connection across a plurality of steering connections (e.g., QUIC connections).

Alternatively, the processor 705 may receive a combined set of rules, i.e., Multi-Access Rules (MARs) that contain QUIC Connection Selection information (these combined set of rules are similar to the "ATSSS rules with QUIC Connection Selection information 505, described above). Here, a rule in the combined set of rules includes a steering mode (e.g., QUIC-LL) and indicates also via which steering connection the first data packet is to be routed. The steering mode indicates via which access network the first data packet is to be routed. In such embodiments, steering the traffic of the multi-access data connection comprises selecting an access network and selecting a steering connection over the selected access network using the combined set of rules.

The processor 705 receives a plurality of steering connection requests (e.g., QUIC connection requests) from the UE, where each request is received over one of the first access network and the second access network. The processor 705 applies the first set of rules and the second set of rules for steering the traffic of the multi-access data connection in response to accepting the plurality of steering connections.

In certain embodiments, steering the traffic of the multi-access data connection comprises selecting an access network using the first set of rules and selecting a steering connection over the selected access network using the second set of rules. In such embodiments, the processor 705 encapsulates traffic of the multi-access data connection within a QUIC datagram frame in response to selecting the steering connection. In certain embodiments, each steering connection is associated with a QoS flow.

In some embodiments, the first type of steering functionality is based on the QUIC protocol, wherein each of the plurality of steering connections corresponds to a different QUIC connection between the network equipment apparatus 700 and the UE. In certain embodiments, each steering connection uses a different UDP port at the network equipment apparatus 700. In certain embodiments, each steering connection uses a different IP address of the network equipment apparatus 700.

In some embodiments, the processor 705 assigns a UDP port and an IP address to each of the plurality of steering connections, in response to receiving the first message. Alternatively, an SMF may assign the UDP port and IP address of each QUIC connection. Here, to each UDP port and IP address indicates the destination of each QUIC connection on the UPF side.

In some embodiments, the steering connections are established according to information in the second set of rules. Here, the QUIC rules sent to the UE include the UDP port/IP address of each QUIC connection so the UE knows how to establish each QUIC connection.

In some embodiments, a rule in the first set of rules includes a steering mode, the steering mode indicating via which access network the first data packet is to be routed, and wherein a rule in the second set of rule indicates via which steering connection the first data packet is to be routed.

In various embodiments, the network apparatus 700 operates as an SMF. In such embodiments, the transceiver 725 supports a first network interface that communicates with an AMF in a mobile communication network and a second network interface that communicates with a PCF in the mobile communication network. Via the transceiver 725, the processor 705 receives a first message via the AMF to establish a multi-access data connection between a UE and a UPF in the mobile communication network over a first access network and a second access network. Here, the first message indicates that the UE supports a first type of steering functionality that creates a plurality of steering connections (e.g., QUIC connections) over each of the first access network and the second access network. In one embodiment, the first message comprises a PDU Session Establishment Request and the first type of steering functionality is the QUIC-LL functionality described herein.

The processor 705 sends a second message to the PCF (i.e., using the transceiver 725). Here, the second message indicates that the remote unit supports the first type of steering functionality. In one embodiment, the second message comprises a SM Policy Control Create Request. Via the transceiver 725, the processor 705 receives a first set of rules (e.g., PCC rules) containing multi-access data connection control information, the multi-access data connection control information including the first type of steering functionality and a steering mode.

The processor 705 determines a second set of rules (e.g., rules for the UE) from the first set of rules and determines a third set of rules (e.g., rules for the UPF) from the first set of rules. The second set of rules indicate how to route an uplink data packet across the first access network and the second access network and how to route the uplink data packet across a plurality of steering connections and the third set of rules indicate how to route a downlink data packet across the first access network and the second access network and how to route the downlink packet across a plurality of steering connections. The processor 705 selects a UPF that supports the first type of steering functionality and controls the transceiver 725 to send the second set of rules to the remote unit via the AMF and to send the third set of rules to the selected UPF.

In certain embodiments, each steering connection is associated with a QoS flow. In certain embodiments, each steering connection uses a different IP address of the selected UPF. In certain embodiments, a rule in the first set of rules includes a steering mode, the steering mode indicating via which access network the first data packet is to be routed, the rule also indicating via which steering connection the first data packet is to be routed.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media. In some embodiments, the memory 710 stores data relating to steering the traffic of the multi-access data connection over a plurality of steering connections, for example storing ANI, IP addresses, UE contexts, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more interworking functions that provide access to one or more PLMNs. The transceiver 725 may also communicate with one or more network functions (e.g., in the mobile core network 140). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

FIG. 8 depicts a method 800 for steering the traffic of the multi-access data connection over a plurality of steering connections, according to embodiments of the disclosure. In some embodiments, the method 800 is performed by a UE, such as the remote unit 105, the UE 205 and/or the user equipment apparatus 600. In certain embodiments, the method 800 may be performed by a processor executing program code, for example, a microcontroller, a microprocessor, a CPU, a GPU, an auxiliary processing unit, a FPGA, or the like.

The method 800 begins and sends 805 a first message (e.g., a PDU Session Establishment Request) to establish a multi-access data connection with the mobile communication network over the first access network and the second access network, where the first message indicates that the apparatus supports a first type of steering functionality (e.g., QUIC-LL) that creates a plurality of steering connections (e.g., QUIC connections) over each of the first access network and the second access network.

The method 800 includes receiving 810 a second message (e.g., a PDU Session Establishment Accept message) including a first set of rules (e.g., ATSSS rules) and a second set of rules (e.g., QUIC rules), where the first set of rules indicate how to route a first data packet across the first access network and the second access network by using the first type of steering functionality and the second set of rules indicate how to route the first data packet across a plurality of steering connections.

The method 800 includes establishing 815 a plurality of steering connections over each of the first access network and the second access network in response to receiving the second message. The method 800 includes applying 820 the first set of rules and the second set of rules for steering the traffic of the multi-access data connection. The method 800 ends.

FIG. 9 depicts a method 900 for steering the traffic of the multi-access data connection over a plurality of steering connections, according to embodiments of the disclosure. In some embodiments, the method 900 is performed by user-plane network function, such as the UPF 141, the UPF 250, and/or the network apparatus 700. In certain embodiments, the method 900 may be performed by a processor executing program code, for example, a microcontroller, a microprocessor, a CPU, a GPU, an auxiliary processing unit, a FPGA, or the like.

The method 900 begins and communicates 905 with a UE via a first access network and via a second access network, wherein the remote unit supports a first type of steering functionality (e.g., QUIC-LL) that creates a plurality of steering connections (e.g., QUIC connections) over each of the first access network and the second access network.

The method 900 includes receiving 910 a first message (e.g., a N4 Session Establishment Request) at a UPF, the first message including a first set of rules (e.g., Multi Access rules) and a second set of rules (e.g., QUIC rules), where the first set of rules indicate how to route traffic of a multi-access data connection of the UE across the first access network and the second access network by using the first type of steering functionality and the second set of rules indicate how to route traffic of the multi-access data connection across a plurality of steering connections.

The method 900 includes receiving 915 a plurality of steering connection requests (e.g., QUIC connection requests) from the UE, where each request is received over one of the first access network and the second access network. The method 900 includes applying 920 the first set of rules and the second set of rules for steering the traffic of the multi-access data connection in response to accepting the plurality of steering connections. The method 900 ends.

FIG. 10 depicts a method 1000 for steering the traffic of the multi-access data connection over a plurality of steering connections, according to embodiments of the disclosure. In some embodiments, the method 1000 is performed by a session management network function, such as the SMF 145, the SMF 305, and/or the network apparatus 700. In certain embodiments, the method 1000 may be performed by a processor executing program code, for example, a microcontroller, a microprocessor, a CPU, a GPU, an auxiliary processing unit, a FPGA, or the like.

The method 1000 begins and receives 1005 a first message via the AMF to establish a multi-access data connection between a UE and a UPF in the mobile communication network over a first access network and a second access network. Here, the first message indicates that the UE supports a first type of steering functionality that creates a plurality of steering connections (e.g., QUIC connections) over each of the first access network and the second access network. In one embodiment, the first message comprises a PDU Session Establishment Request and the first type of steering functionality is the QUIC-LL functionality described herein.

The method 1000 includes sending 1010 a second message to the PCF. Here, the second message indicates that the remote unit supports the first type of steering functionality. In one embodiment, the second message comprises a SM Policy Control Create Request.

The method 1000 includes receiving 1015 a first set of rules (e.g., PCC rules) containing multi-access data connection control information, the multi-access data connection control information including the first type of steering functionality and a steering mode.

The method 1000 includes determining 1020 a second set of rules (e.g., rules for the UE) from the first set of rules. Here, the second set of rules indicate how to route an uplink data packet across the first access network and the second access network and how to route the uplink data packet across a plurality of steering connections.

The method 1000 includes determining 1025 a third set of rules (e.g., rules for the UPF) from the first set of rules. Here, the third set of rules indicate how to route a downlink data packet across the first access network and the second access network and how to route the downlink packet across a plurality of steering connections.

The third method includes selecting 1030 a UPF that supports the first type of steering functionality. The third method includes sending 1035 the second set of rules to the remote unit via the AMF. The third method includes sending 1040 the third set of rules to the selected UPF. The method 1000 ends.

Disclosed herein is a first apparatus for steering the traffic of the multi-access data connection over a plurality of steering connections, according to embodiments of the disclosure. The first apparatus may be implemented by a UE, such as the remote unit 105, the UE 205, and/or the user equipment apparatus 600. The first apparatus includes a first transceiver that communicates with a mobile communication network via a first access network and a second transceiver that communicates with the mobile communication network via a second access network. In certain embodiments, the first and second transceivers are combined into a single transceiver. The first apparatus includes a processor that sends a first message (e.g., a PDU Session Establishment Request) to establish a multi-access data connection with the mobile communication network over the first access network and the second access network, where the first message indicates that the apparatus supports a first type of steering functionality (e.g., QUIC-LL) that creates a plurality of steering connections (e.g., QUIC connections) over each of the first access network and the second access network.

The processor receives a second message (e.g., a PDU Session Establishment. Accept message) including a first set of rules (e.g., ATSSS rules) and a second set of rules (e.g., QUIC rules), where the first set of rules indicate how to route a first data packet across the first access network and the second access network by using the first type of steering functionality and the second set of rules indicate how to route the first data packet across a plurality of steering connections. Alternatively, the processor may receive a combined set of rules formed from the first and second set of rules (for example, see the "ATSSS rules with QUIC Connection Selection information 505, described above). Here, a rule in the combined set of rules includes a steering mode (e.g., QUIC-LL) and indicates via which steering connection the first data packet is to be routed. The steering mode indicates via which access network the first data packet is to be routed.

The processor establishes a plurality of steering connections (e.g., QUIC connections) over each of the first access network and the second access network in response to receiving the second message and the processor applies the first set of rules and the second set of rules for steering the traffic of the multi-access data connection.

In some embodiments, steering the traffic of the multi-access data connection comprises selecting an access network using the first set of rules and selecting a steering connection over the selected access network using the second set of rules. Alternatively, the processor steers the traffic of the multi-access data connection by selecting an access network and selecting a steering connection over the selected access network using the combined set of rules.

In certain embodiments, the processor encapsulates traffic of the multi-access data connection within a QUIC datagram frame in response to selecting the steering connection. In some embodiments, each steering connection is associated with a QoS flow.

In some embodiments, each steering connection terminates in a common UPF. In certain embodiments, each steering connection uses a different UDP port at the common UPF. In certain embodiments, each steering connection uses a different IP address of the common UPF. In some embodiments, the first type of steering functionality is based on the QUIC protocol, wherein each of the plurality of steering connections corresponds to a different QUIC connection between the apparatus and the common UPF.

In some embodiments, the steering connections are established according to information in the second set of rules. In various embodiments, a rule in the first set of rules includes a steering mode, the steering mode indicating via which access network the first data packet is to be routed, and wherein a rule in the second set of rule indicates via which steering connection the first data packet is to be routed.

Disclosed herein is a first method for steering the traffic of the multi-access data connection over a plurality of steering connections. The first method may be performed by a UE, such as the remote unit 105, the UE 205, and/or the user equipment apparatus 600. The first method includes sending a first message (e.g., a PDU Session Establishment Request)

to establish a multi-access data connection with the mobile communication network over the first access network and the second access network, where the first message indicates that the apparatus supports a first type of steering functionality (e.g., QUIC-LL) that creates a plurality of steering connections (e.g., QUIC connections) over each of the first access network and the second access network.

The first method includes receiving a second message (e.g., a PDU Session Establishment Accept message) including a first set of rules (e.g., ATSSS rules) and a second set of rules (e.g., QUIC rules), where the first set of rules indicate how to route a first data packet across the first access network and the second access network by using the first type of steering functionality and the second set of rules indicate how to route the first data packet across a plurality of steering connections. Alternatively, the second message may include a combined set of rules formed from the first and second set of rules (for example, see the "ATSSS rules with QUIC Connection Selection information 505, described above). Here, a rule in the combined set of rules includes a steering mode (e.g., QUIC-LL) and indicates via which steering connection the first data packet is to be routed. The steering mode indicates via which access network the first data packet is to be routed.

The first method includes establishing a plurality of steering connections over each of the first access network and the second access network in response to receiving the second message and applying the first set of rules and the second set of rules for steering the traffic of the multi-access data connection.

In some embodiments, steering the traffic of the multi-access data connection may include selecting an access network using the first set of rules and selecting a steering connection over the selected access network using the second set of rules. Alternatively, steering the traffic of the multi-access data connection may include selecting an access network and selecting a steering connection over the selected access network using the combined set of rules.

In certain embodiments, the first method includes encapsulating traffic of the multi-access data connection within a QUIC datagram frame in response to selecting the steering connection. In some embodiments, each steering connection is associated with a QoS flow.

In some embodiments, each steering connection terminates in a common UPF. In certain embodiments, each steering connection uses a different UDP port at the common UPF. In certain embodiments, each steering connection uses a different IP address of the common UPF. In some embodiments, the first type of steering functionality is based on the QUIC protocol, wherein each of the plurality of steering connections corresponds to a different QUIC connection between the apparatus and the common UPF.

In some embodiments, the steering connections are established according to information in the second set of rules. In various embodiments, a rule in the first set of rules includes a steering mode, the steering mode indicating via which access network the first data packet is to be routed, and wherein a rule in the second set of rule indicates via which steering connection the first data packet is to be routed.

Disclosed herein is a second apparatus for steering the traffic of the multi-access data connection over a plurality of steering connections, according to embodiments of the disclosure. The second apparatus may be implemented by a UPF, such as the UPF 141, the UPF 250, and or the network equipment apparatus 700. The second apparatus includes a processor and a memory that stores code executable by the processor to: A) communicate with a remote unit via a first access network, B) communicate with the remote unit via a second access network, wherein the remote unit supports a first type of steering functionality (e.g., QUIC-LL) that creates a plurality of steering connections (e.g., QUIC connections) over each of the first access network and the second access network, C) receive a first message (e.g., an N4 Session Establishment Request) including a first set of rules (e.g., Multi-Access rules) and a second set of rules (e.g., QUIC rules), where the first set of rules indicate how to route traffic of a multi-access data connection of the remote unit across the first access network and the second access network by using the first type of steering functionality and the second set of rules indicate how to route traffic of the multi-access data connection across a plurality of steering connections, D) receive a plurality of steering connection requests (e.g., QUIC connection requests) from the remote unit, where each request is received over one of the first access network and the second access network, and E) apply the first set of rules and the second set of rules for steering the traffic of the multi-access data connection in response to accepting the plurality of steering connections.

In some embodiments, the first message includes a combined set of rules formed from the first and second set of rules (for example, see the "ATSSS rules with QUIC Connection Selection information" 505, described above). Here, a rule in the combined set of rules includes a steering mode (e.g., QUIC-LL) and indicates via which steering connection the first data packet is to be routed. The steering mode indicates via which access network the first data packet is to be routed. In such embodiments, steering the traffic of the multi-access data connection comprises selecting an access network and selecting a steering connection over the selected access network using the combined set of rules.

In certain embodiments, steering the traffic of the multi-access data connection comprises selecting an access network using the first set of rules and selecting a steering connection over the selected access network using the second set of rules. In such embodiments, the processor encapsulates traffic of the multi-access data connection within a QUIC datagram frame in response to selecting the steering connection. In certain embodiments, each steering connection is associated with a QoS flow.

In some embodiments, the first type of steering functionality is based on the QUIC protocol, wherein each of the plurality of steering connections corresponds to a different QUIC connection between the apparatus and the remote unit. In certain embodiments, each steering connection uses a different UDP port at the apparatus. In certain embodiments, each steering connection uses a different IP address of the apparatus.

In some embodiments, the processor assigns a UDP port and an IP address to each of the plurality of steering connections, in response to receiving the first message. Alternatively, an SMF may assign the UDP port and IP address of each QUIC connection. Here, each UDP port and IP address indicates the destination of each QUIC connection on the UPF side.

In some embodiments, the steering connections are established according to information in the second set of rules. Here, the QUIC rules sent to the UE include the UDP port/IP address of each QUIC connection so the UE knows how to establish each QUIC connection.

In some embodiments, a rule in the first set of rules includes a steering mode, the steering mode indicating via which access network the first data packet is to be routed, and wherein a rule in the second set of rule indicates via which steering connection the first data packet is to be routed.

Disclosed herein is a second method for steering the traffic of the multi-access data connection over a plurality of steering connections, according to embodiments of the disclosure. The second method may be performed by a UPF, such as the UPF 141, the UPF 250, and/or the network equipment apparatus 700. The second method includes communicating with a UE via a first access network and via a second access network, wherein the remote unit supports a first type of steering functionality (e.g., QUIC-LL) that creates a plurality of steering connections (e.g., QUIC connections) over each of the first access network and the second access network and receiving a first message (e.g., an N4 Session Establishment Request) at a UPF, the first message including a first set of rules (e.g., Multi Access rules) and a second set of rules (e.g., QUIC rules), where the first set of rules indicate how to route traffic of a multi-access data connection of the UE across the first access network and the second access network by using the first type of steering functionality and the second set of rules indicate how to route traffic of the multi-access data connection across a plurality of steering connections.

The second method includes receiving a plurality of steering connection requests (e.g., QUIC connection requests) from the UE, where each request is received over one of the first access network and the second access network and applying the first set of rules and the second set of rules for steering the traffic of the multi-access data connection in response to accepting the plurality of steering connections.

In some embodiments, the first message includes a combined set of rules formed from the first and second set of rules (for example, see the "ATSSS rules with QUIC Connection Selection information" 505, described above). Here, a rule in the combined set of rules includes a steering mode (e.g., QUIC-LL) and indicates via which steering connection the first data packet is to be routed. The steering mode indicates via which access network the first data packet is to be routed. In such embodiments, steering the traffic of the multi-access data connection comprises selecting an access network and selecting a steering connection over the selected access network using the combined set of rules.

In certain embodiments, steering the traffic of the multi-access data connection comprises selecting an access network using the first set of rules and selecting a steering connection over the selected access network using the second set of rules. In such embodiments, the processor encapsulates traffic of the multi-access data connection within a QUIC datagram frame in response to selecting the steering connection. In certain embodiments, each steering connection is associated with a QoS flow.

In some embodiments, the first type of steering functionality is based on the QUIC protocol, wherein each of the plurality of steering connections corresponds to a different QUIC connection between the apparatus and the remote unit. In certain embodiments, each steering connection uses a different UDP port at the apparatus. In certain embodiments, each steering connection uses a different IP address of the apparatus.

In some embodiments, the second method further includes assigning a UDP port and an IP address to each of the plurality of steering connections, in response to receiving the first message. Alternatively, an SMF may assign the UDP port and IP address of each QUIC connection. Here, each UDP port and IP address indicates the destination of each QUIC connection on the UPF side.

In some embodiments, the steering connections are established according to information in the second set of rules. Here, the QUIC rules sent to the UE include the UDP port/IP address of each QUIC connection so the UE knows how to establish each QUIC connection.

In some embodiments, a rule in the first set of rules includes a steering mode, the steering mode indicating via which access network the first data packet is to be routed, and wherein a rule in the second set of rule indicates via which steering connection the first data packet is to be routed.

Disclosed herein is a third apparatus for steering the traffic of the multi-access data connection over a plurality of steering connections, according to embodiments of the disclosure. The third apparatus may be implemented by a SMF, such as the SMF 145, the SMF 305, and/or the network equipment apparatus 700. The third apparatus includes a first network interface that communicates with an AMF in a mobile communication network and a second network interface that communicates with a PCF in the mobile communication network. The third apparatus includes a processor that receives a first message via the AMF to establish a multi-access data connection between a UE and a UPF in the mobile communication network over a first access network and a second access network. Here, the first message indicates that the UE supports a first type of steering functionality that creates a plurality of steering connections (e.g., QUIC connections) over each of the first access network and the second access network. In one embodiment, the first message comprises a PDU Session Establishment Request and the first type of steering functionality is the QUIC-LL functionality described herein.

The processor sends a second message to the PCF. Here, the second message indicates that the remote unit supports the first type of steering functionality. In one embodiment, the second message comprises a SM Policy Control Create Request. The processor receives a first set of rules (e.g., PCC rules) containing multi-access data connection control information, the multi-access data connection control information including the first type of steering functionality and a steering mode.

The processor determines a second set of rules (e.g., rules for the UE) from the first set of rules and determines a third set of rules (e.g., rules for the UPF) from the first set of rules. The second set of rules indicate how to route an uplink data packet across the first access network and the second access network and how to route the uplink data packet across a plurality of steering connections and the third set of rules indicate how to route a downlink data packet across the first access network and the second access network and how to route the downlink packet across a plurality of steering connections. The processor selects a UPF that supports the first type of steering functionality, sends the second set of rules to the remote unit via the AMF, and sends the third set of rules to the selected UPF.

In certain embodiments, each steering connection is associated with a QoS flow. In certain embodiments, each steering connection uses a different IP address of the selected UPF. In certain embodiments, a rule in the first set of rules includes a steering mode, the steering mode indicating via which access network the first data packet is to be routed, the rule also indicating via which steering connection the first data packet is to be routed.

In some embodiments, the processor assigns a UDP port and an IP address to each of the plurality of steering connections, in response to receiving the first message. Alternatively, a UPF may assign the UDP port and IP address of each QUIC connection. Here, each UDP port and IP address indicates the destination of each QUIC connection on the UPF side. The QUIC rules sent to UE include the UDP port/IP address of each QUIC connection so the UE knows how to establish each of them.

Disclosed herein is a third method for steering the traffic of the multi-access data connection over a plurality of steering connections, according to embodiments of the disclosure. The third method may be performed by a SMF, such as the SMF 145, the SMF 305, and/or the network equipment apparatus 700. The third method includes receiving a first message via the AMF to establish a multi-access data connection between a UE and a UPF in the mobile communication network over a first access network and a second access network. Here, the first message indicates that the UE supports a first type of steering functionality that creates a plurality of steering connections (e.g., QUIC connections) over each of the first access network and the second access network. In one embodiment, the first message comprises a PDU Session to Establishment Request and the first type of steering functionality is the QUIC-LL functionality described herein.

The third method includes sending a second message to the PCF. Here, the second message indicates that the remote unit supports the first type of steering functionality. In one embodiment, the second message comprises a SM Policy Control Create Request. The processor receives a first set of rules (e.g., PCC rules) containing multi-access data connection control information, the multi-access data connection control information including the first type of steering functionality and a steering mode.

The third method includes determining a second set of rules (e.g., rules for the UE) from the first set of rules and determining a third set of rules (e.g., rules for the UPF) from the first set of rules. The second set of rules indicate how to route an uplink data packet across the first access network and the second access network and how to route the uplink data packet across a plurality of steering connections and the third set of rules indicate how to route a downlink data packet across the first access network and the second access network and how to route the downlink packet across a plurality of steering connections. The third method includes selecting a UPF that supports the first type of steering functionality, sending the second set of rules to the remote unit via the AMF, and sending the third set of rules to the selected UPF.

In certain embodiments, each steering connection is associated with a QoS flow. In certain embodiments, each steering connection uses a different IP address of the selected UPF. In certain embodiments, a rule in the first set of rules includes a steering mode, the steering mode indicating via which access network the first data packet is to be routed, the rule also indicating via which steering connection the first data packet is to be routed.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:

at least one memory; and at least one processor coupled with the at least one memory and configured to cause the UE to:

transmit a first message to establish a multi-access data connection over a first access network and a second access network, wherein the first message indicates that the UE supports a type of steering functionality corresponding to a plurality of steering connections over the first access network and the second access network, wherein the type of steering functionality corresponds to a lower layer steering functionality based on a transport protocol;

receive a second message that indicates a first set of rules for routing traffic over the first access network and the second access network using the type of steering functionality, and a second set of rules for routing the traffic over the plurality of steering connections;

establish the multi-access data connection over the first access network and the second access network, wherein the multi-access data connection is associated with a plurality of quality-of-service (QOS) flows;

establish the plurality of steering connections over the first access network and the second access network in response to the first message or the second message, or both, wherein the plurality of steering connections comprises a first set of steering connections over the first access network and a second set of steering connections over the second access network, and wherein the plurality of steering connections corresponds to the plurality of QOS flows in accordance with a one-to-one mapping; and apply the first set of rules and the second set of rules for routing the traffic of the multi-access data connection.

2. The UE of claim 1, wherein:

the first set of rules or the second set of rules, or both, indicates a steering mode, the steering mode indicates the first access network or the second access network for routing the traffic; and the steering mode further indicates a steering connection of the plurality of steering connections for routing the traffic.

3. The UE of claim 1, wherein the at least one processor is configured to cause the UE to:

select the first access network or the second access network based on the first set of rules;

select a steering connection of the plurality of steering connections based on the second set of rules, wherein the steering connection is associated with the selected first access network or the selected second access network; and route the traffic of the multi-access data connection based on the selected first access network or the selected second access network and the selected steering connection.

4. The UE of claim 1, wherein the at least one processor is configured to cause the UE to encapsulate the traffic within a datagram frame according to the transport protocol.

5. The UE of claim 1, wherein each steering connection of the plurality of steering connections terminates at a common User-Plane Function (UPF).

6. The UE of claim 5, wherein each of the plurality of steering connections corresponds to a different transport protocol connection between the UE and the common UPF.

7. The UE of claim 5, wherein each steering connection of the plurality of steering connections is associated with a different User-Datagram Protocol (UDP) port.

8. The UE of claim 5, wherein each steering connection of the plurality of steering connections is associated with a different Internet Protocol (IP) address.

9. The UE of claim 1, wherein the at least one processor is configured to cause the UE to establish the plurality of steering connections according to the second set of rules.

10. The UE of claim 1, wherein:

the first set of rules indicates a steering mode;

the steering mode indicates the first access network or the second access network for routing the traffic; and the second set of rules indicates a steering connection for routing the traffic.

11. A method performed by a user equipment (UE), the method comprising:

transmitting a first message to establish a multi-access data connection over a first access network and a second access network, wherein the first message indicates that the UE supports a type of steering functionality corresponding to a plurality of steering connections over the first access network and the second access network, wherein the type of steering functionality corresponds to a lower layer steering functionality based on a transport protocol;

receiving a second message that indicates a first set of rules for routing traffic over the first access network and the second access network using the type of steering functionality, and a second set of rules for routing the traffic over the plurality of steering connections;

establishing the multi-access data connection over the first access network and the second access network, wherein the multi-access data connection is associated with a plurality of quality-of-service (QOS) flows;

establishing the plurality of steering connections over the first access network and the second access network in response to the first message or the second message, or both, wherein the plurality of steering connections comprises a first set of steering connections over the first access network and a second set of steering connections over the second access network, and wherein the plurality of steering connections corresponds to the plurality of QoS flows in accordance with a one-to-one mapping; and applying the first set of rules and the second set of rules for routing the traffic of the multi-access data connection.

12. The method of claim 11, wherein:

the first set of rules or the second set of rules, or both, indicates a steering mode, the steering mode indicates the first access network or the second access network for routing the traffic; and the steering mode further indicates a steering connection of the plurality of steering connections for routing the traffic.

13. The method of claim 11, further comprising:

selecting the first access network or the second access network based on the first set of rules;

selecting a steering connection of the plurality of steering connections based on the second set of rules, wherein the steering connection is associated with the selected first access network or the selected second access network; and routing the traffic of the multi-access data connection based on the selected first access network or the selected second access network and the selected steering connection.

14. The method of claim 13, further comprising encapsulating traffic within a datagram frame according to the transport protocol.

15. The method of claim 11, wherein each steering connection of the plurality of steering connections terminates at a common User-Plane Function (UPF).

16. The method of claim 15, wherein each of the plurality of steering connections corresponds to a different protocol connection between the UE and the common UPF.

17. The method of claim 15, wherein each steering connection of the plurality of steering connections is associated with a different User-Datagram Protocol (UDP) port.

18. The method of claim 15, wherein each steering connection of the plurality of steering connections is associated with a different Internet Protocol (IP) address.

19. The method of claim 11, further comprising establishing the plurality of steering connections according to the second set of rules.

20. The method of claim 11, wherein:

the first set of rules indicates a steering mode;

the steering mode indicates the first access network or the second access network for routing the traffic; and the second set of rules indicates a steering connection for routing the traffic.

* * * * *